United States Patent
Hwang et al.

(10) Patent No.: US 8,760,553 B2
(45) Date of Patent: Jun. 24, 2014

(54) MOBILE TERMINAL AND IMAGE TRANSMITTING METHOD THEREIN

(75) Inventors: Myunghee Hwang, Seoul (KR); Kyoungtae Son, Gunpo-si (KR); Sunyong Kim, Incheon (KR); Ilkon Kim, Seoul (KR); Jaehoon Jeong, Seoul (KR); Hyunkyung Seong, Hanam-si (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 13/047,636

(22) Filed: Mar. 14, 2011

(65) Prior Publication Data

US 2012/0081556 A1 Apr. 5, 2012

(30) Foreign Application Priority Data

Oct. 4, 2010 (KR) .................. 10-2010-0096276

(51) Int. Cl.
*H04N 5/222* (2006.01)
(52) U.S. Cl.
USPC .................................... 348/333.02
(58) Field of Classification Search
USPC .................................... 348/333.02
See application file for complete search history.

(56) References Cited

U.S. PATENT DOCUMENTS

| | | | |
|---|---|---|---|
| 6,137,525 A | 10/2000 | Lee et al. | |
| 6,636,259 B1 * | 10/2003 | Anderson et al. | 348/211.3 |
| 6,700,674 B1 * | 3/2004 | Otsuka et al. | 358/1.15 |
| 2001/0022618 A1 * | 9/2001 | Ward et al. | 348/207 |
| 2002/0186412 A1 * | 12/2002 | Murashita | 358/1.16 |
| 2003/0030731 A1 * | 2/2003 | Colby | 348/231.3 |
| 2008/0284855 A1 | 11/2008 | Umeyama et al. | |

FOREIGN PATENT DOCUMENTS

| | | |
|---|---|---|
| CN | 101360165 A | 2/2009 |
| EP | 2026554 A1 | 2/2009 |
| JP | 2002-369053 A | 12/2002 |

* cited by examiner

*Primary Examiner* — Anthony J Daniels
(74) *Attorney, Agent, or Firm* — Birch, Stewart, Kolasch & Birch, LLP

(57) ABSTRACT

A mobile terminal and image transmitting method therein are disclosed, by which an image photographed via a camera can be transmitted to a counterpart terminal to correspond to a preset image transmission condition. One embodiment of the present invention includes setting an image transmission condition, photographing the image in a camera photograph mode using a camera, if the image is photographed, checking the set image transmission condition, and transmitting the photographed image to each of at least one or more counterpart terminals to correspond to the checked image transmission condition.

19 Claims, 33 Drawing Sheets (a)

(b)

(a)

(b)

(a)

(b)

(a)

(b)

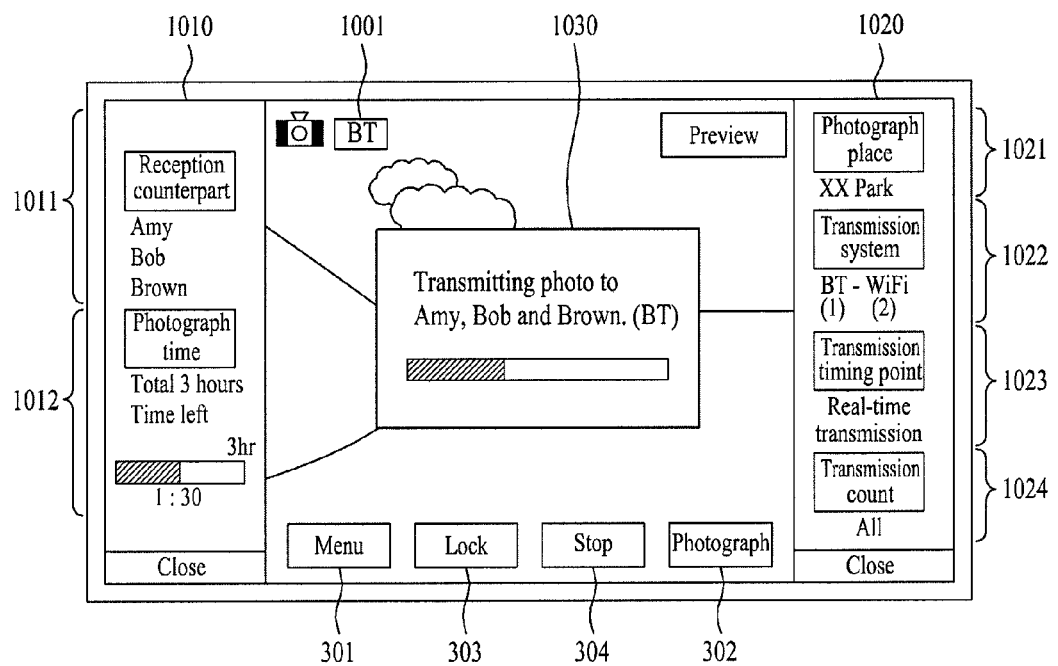
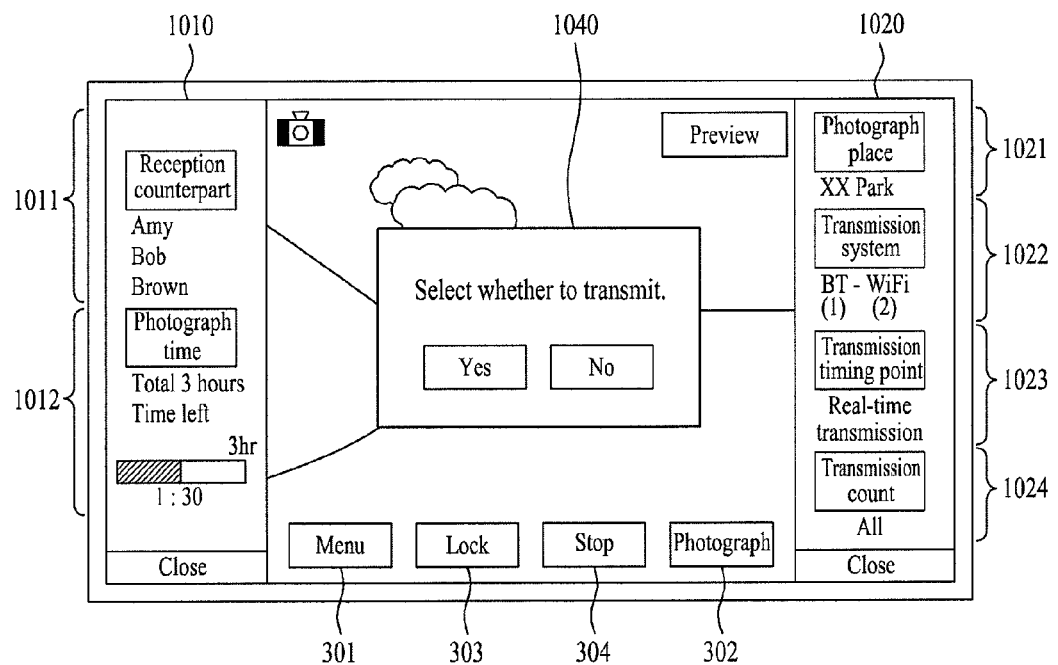

(a)

(b)

(a)

(b)

(a)

(b)

(c)

MOBILE TERMINAL AND IMAGE TRANSMITTING METHOD THEREIN

Pursuant to 35 U.S.C. §119(a), this application claims the benefit of earlier filing date and right of priority to Korean Application No. 10-2010-0096276, filed on Oct. 4, 2010, the contents of which are hereby incorporated by reference herein in their entirety.

BACKGROUND OF THE INVENTION

1. Field of the Invention

The present invention relates to a mobile terminal, and more particularly, to a mobile terminal and image transmitting method therein. Although the present invention is suitable for a wide scope of applications, it is particularly suitable for transmitting an image photographed via a camera to a counterpart terminal.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to a related art, in case of attempting to transmit an image photographed via a camera to a counterpart terminal, a mobile terminal photographs the image, selects a counterpart terminal to receive the photographed image, and is then able to select a system to transmit the photographed image.

Afterwards, the mobile terminal is able to transmit the photographed image to the selected counterpart terminal using the selected system.

However, according to the above-described related art, in case of attempting to transmit the photographed image to the counterpart terminal, it is inconvenient to select the counterpart terminal and the transmitting system one by one.

Moreover, according to the above-described related art, after an image has been photographed, only if a user inputs an image transmitting command, the photographed image can be transmitted to a counterpart terminal.

SUMMARY OF THE INVENTION

Accordingly, the present invention is directed to a mobile terminal and image transmitting method therein that substantially obviate one or more problems due to limitations and disadvantages of the related art.

An object of the present invention is to provide a mobile terminal and image transmitting method therein, by which an image photographed via a camera can be transmitted to a counterpart terminal to correspond to a preset image transmission condition.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a user input unit configured to receive an input of a user action to set an image transmission condition, a camera configured to photograph an image in a camera photograph mode, a controller setting the image transmission condition corresponding to the inputted user action, the controller checking the set image transmission condition in case of an image photographing using the camera, and a wireless communication unit configured to transmit the photographed image to each of at least one or more counterpart terminals to correspond to the checked image transmission condition under the control of the controller.

In another aspect of the present invention, a method of transmitting an image in a mobile terminal includes the steps of setting an image transmission condition, photographing the image in a camera photograph mode using a camera, if the image is photographed, checking the set image transmission condition, and transmitting the photographed image to each of at least one or more counterpart terminals to correspond to the checked image transmission condition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 10A to 10E are diagrams of screen configurations for displaying preset image transmission conditions on a preview screen according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
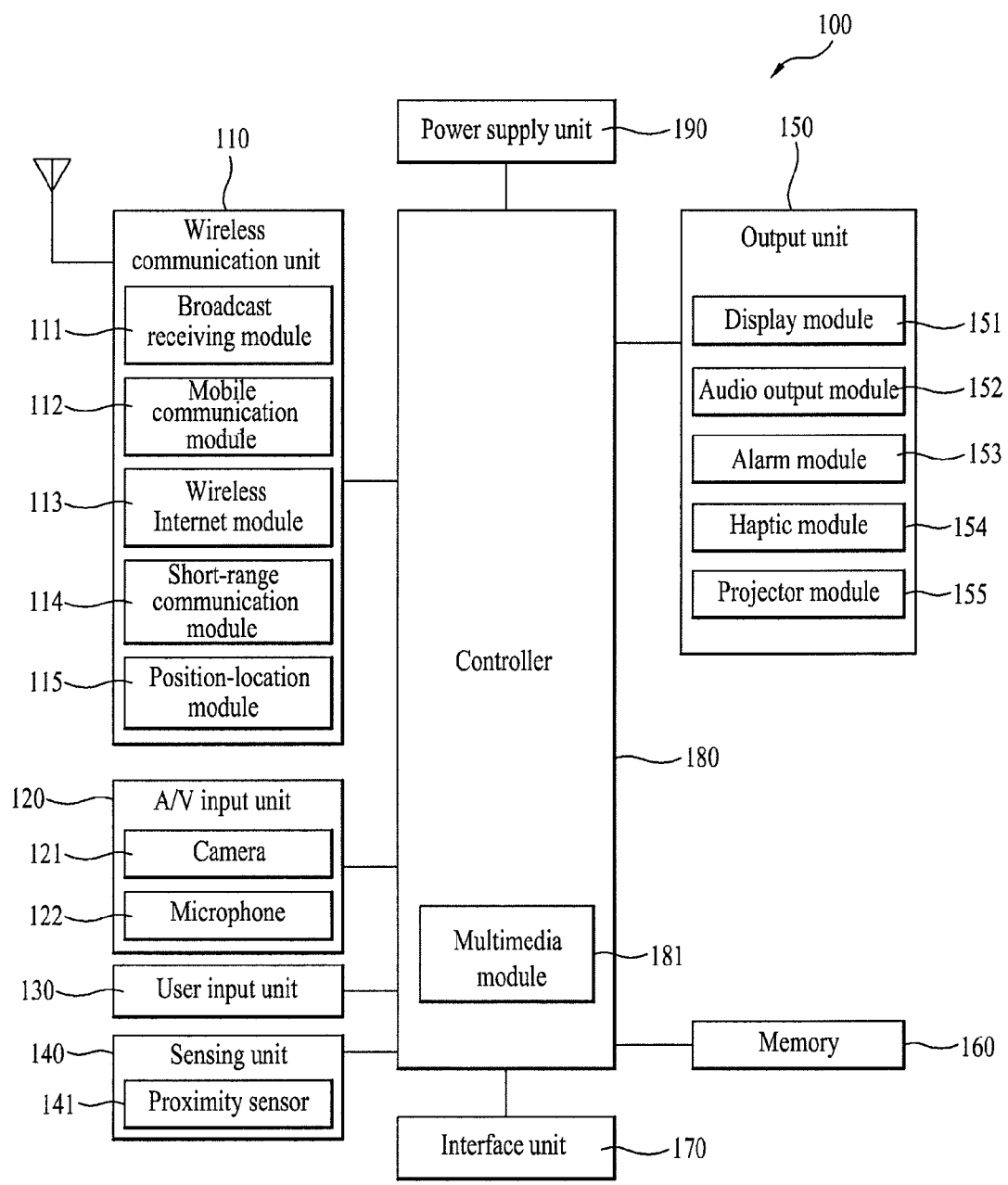
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display module 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display module 151, an audio output module 152, an alarm module 153, a haptic module 154, a projector module 155 and the like.

The display module 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display module 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display module 151 can be implemented in the optical transmittive type as well. In this configuration, a user is able to see an object in rear of a terminal body via the area occupied by the display module 151 of the terminal body.

At least two display modules 151 can be provided to the mobile terminal 100 in accordance with the implemented configuration of the mobile terminal 100. For instance, a plurality of display modules can be arranged on a single face of the mobile terminal 100 in a manner of being spaced apart from each other or being built in one body. Alternatively, a plurality of display modules can be arranged on different faces of the mobile terminal 100.

In case that the display module 151 and a sensor for detecting a touch action (hereinafter called 'touch sensor') configures a mutual layer structure (hereinafter called 'touchscreen'), it is able to use the display module 151 as an input device as well as an output device. In this case, the touch sensor can be configured as a touch film, a touch sheet, a touchpad or the like.

The touch sensor can be configured to convert a pressure applied to a specific portion of the display module 151 or a variation of a capacitance generated from a specific portion of the display module 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display module 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm module 153 is output a signal for announcing the occurrence of a particular event associated with the mobile terminal 100. Typical events include a call received event, a message received event and a touch input received event. The alarm module 153 is able to output a signal for announcing the event occurrence by way of vibration as well as video or audio signal. The video or audio signal can be outputted via the display module 151 or the audio output unit 152. Hence, the display module 151 or the audio output module 152 can be regarded as a part of the alarm module 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display module 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-minor device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

First of all, a mobile terminal mentioned in the following description can include at least one of the components shown in FIG. 1. Moreover, a mobile terminal can include at least one camera configured to photograph an externally inputted image.

In the following description, an image transmitting method according to the present invention is explained in detail with reference to the accompanying drawings.

Figure 2:
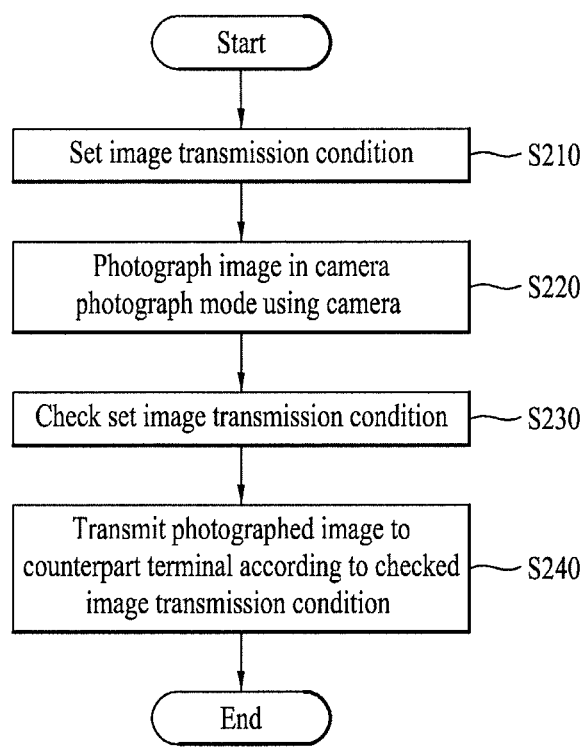
FIG. 2 is a flowchart for a method of transmitting an image in a mobile terminal according to one embodiment of the present invention.

FIG. 2 is a flowchart for a method of transmitting an image in a mobile terminal according to one embodiment of the present invention.

Referring to FIG. 2, the mobile terminal 100 receives an input of a user action for setting an image transmission condition via the user input unit 130 and then sets the image transmission condition corresponding to the inputted user action under the control of the controller 180 [S210].

In this case, when the mobile terminal 100 photographs an image in a camera photograph mode, the image transmission condition can include a condition for transmitting the photographed image to a counterpart terminal by maintaining the camera photograph mode.

And, while the camera 121 is activated, the camera photograph mode can include a mode for displaying an externally inputted image as a preview screen or photographing the externally inputted image.

For instance, the image transmission condition can include at least one of a photograph time, a photograph place, a counterpart terminal to receive a photographed image (hereinafter named a receiving side terminal), an image transmission system, an image transmission timing point, an image transmission count and the like.

In particular, if the image transmission condition is set to the photograph time, the controller 180 is able to transmit an image, which is photographed for the set photograph time, to the counterpart terminal. If the image transmission condition is set to the photograph place, the controller 180 is able to transmit an image, which is photographed at the set photograph place, to the counterpart terminal.

If the image transmission condition is set to the receiving side terminal, the controller 180 is able to transmit a photographed image to the set receiving side terminal. If the image transmission condition is set to the image transmission system, the controller 180 is able to transmit a photographed image using the set image transmission system.

If the image transmission condition is set to the image transmission timing point, the controller 180 is able to transmit a photographed image at the set image transmission timing point. If the image transmission condition is set to the image transmission count, the controller 180 is able to transmit images amounting to the set image transmission count.

The setting step S210 can be performed while a preview screen is displayed in a camera photograph mode. Therefore, a user is able to set the image transmission condition as soon as the user checks the preview image. Alternatively, of course, the setting steps S210 can be performed by an execution of a menu item, which corresponds to an image transmission condition setting, found via a general menu search before entry into the camera photograph mode.

And, the image transmission condition set in the setting step S20 can be stored in the memory 160.

The image transmission condition set in the setting step S210 can be cancelled if the currently executed camera photograph mode is terminated. In this case, the cancellation of the setting is randomly performed by the controller 180 or can be performed by a user selection.

In the following description, the setting step S210 is explained in detail with reference to FIGS. 3A to 9C. For clarity of the following description, assume that an image transmission condition is set in the course of displaying a preview screen in a camera photograph mode.

Figure 3A:
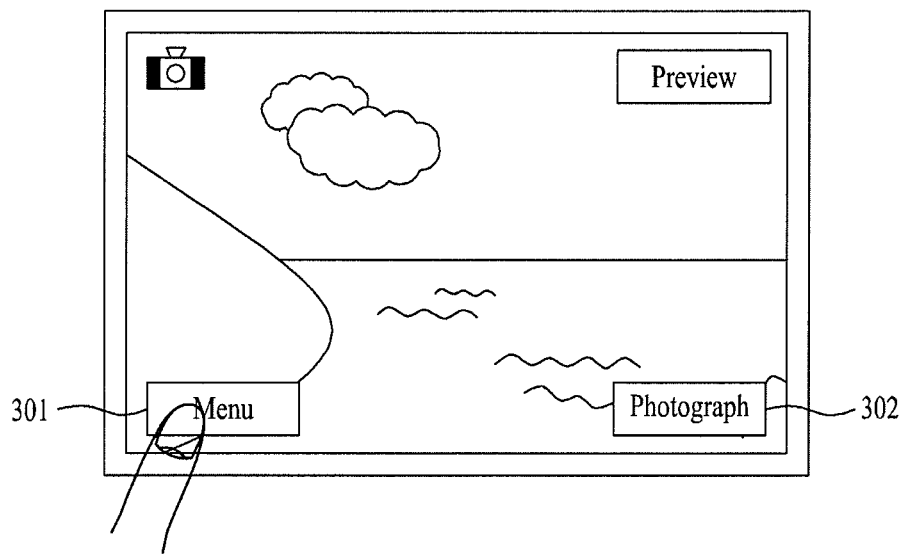
FIGS. 3A to 3C are diagrams of screen configurations for setting an image transmission condition according to the present invention.
Figure 3B:
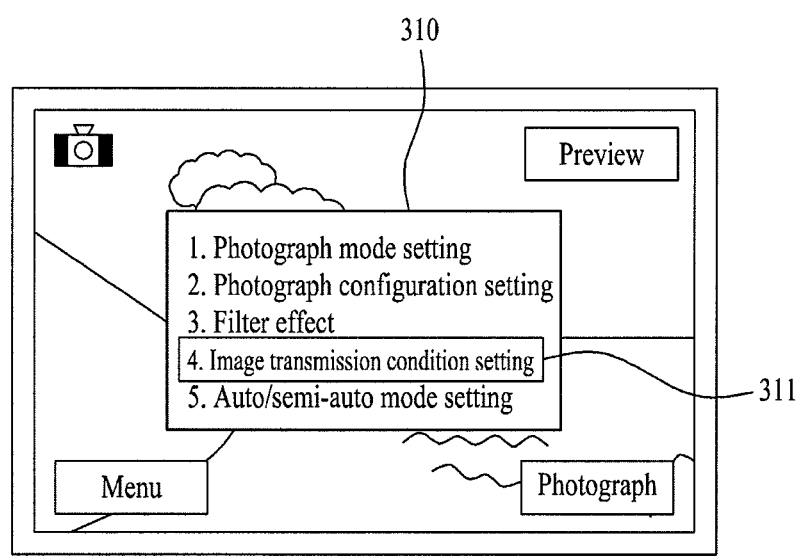
Figure 3C:
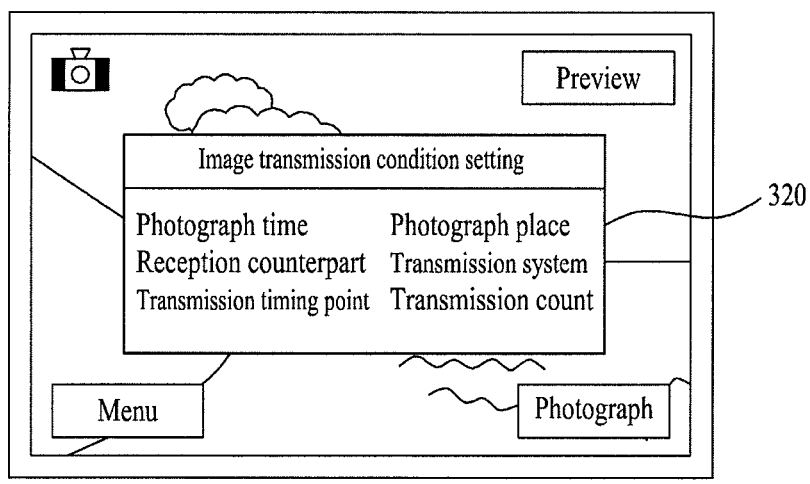

FIGS. 3A to 3C are diagrams of screen configurations for setting an image transmission condition according to the present invention.

Referring to FIG. 3A, the mobile terminal 100 is able to display an image, which is inputted via the camera 121 in a camera photograph mode, on a preview screen.

In this case, a zone (menu) 301 for receiving an input of a display command for displaying a camera related menu item and a zone (photograph) 302 for receiving an input of a photograph command can be included in the preview screen.

Referring to FIG. 3B, if the menu 301 is selected or touched in FIG. 3A, the mobile terminal 100 is able to display a window 310 including camera related menu items therein on the preview screen.

For instance, the camera related menu items 310 can include a photograph mode setting (e.g., a normal photographing, a self-photographing, a burst mode photographing, a panoramic photographing, etc.), a photographing configuration setting (e.g., an light intensity exposure level, a focusing, a timer, a resolution, a white balance, etc.), a filter effect (e.g., normal, negative, black & white, sepia, etc.), an image transmission condition setting, auto/semi-auto mode setting and the like.

In this case, when an image is photographed in a camera photograph mode, the auto mode means a mode for transmitting the photographed image to a counterpart terminal according to a preset image transmission condition without an input of a separate transmission command. When an image is photographed in a camera photograph mode, the semi-auto mode means a mode for transmitting the photographed image to a counterpart terminal according to a preset image transmission condition in case of receiving an input of a separate transmission command.

Therefore, a user selects a menu item of the auto/semi-auto mode setting and is then able to set the auto mode or the semi-auto mode.

Referring to FIG. 3C, if a menu item 311 of the image transmission condition setting is selected or touched in FIG. 3B, the mobile terminal is able to display a window 320 including settable image transmission conditions on the preview screen.

As mentioned in the above description, although the window 310 or 320 of a popup window type is displayed, the mobile terminal 100 is able to display the preview image and the window 31/320 on a first region and a second region using a screen partitioning, respectively. Alternatively, the mobile terminal 100 is able to display the window 310 or 320 on a whole screen, while the preview screen is displayed as a background.

Besides, a zone (not shown in the drawings) for receiving an input of an image transmission condition setting command can be displayed by the mobile terminal 100 on the preview screen in FIG. 3A. If a user selects or touches the displayed zone for receiving the input of the image transmission condition setting, the mobile terminal 100 is able to directly display the screen shown in FIG. 3C.

Figure 4A:
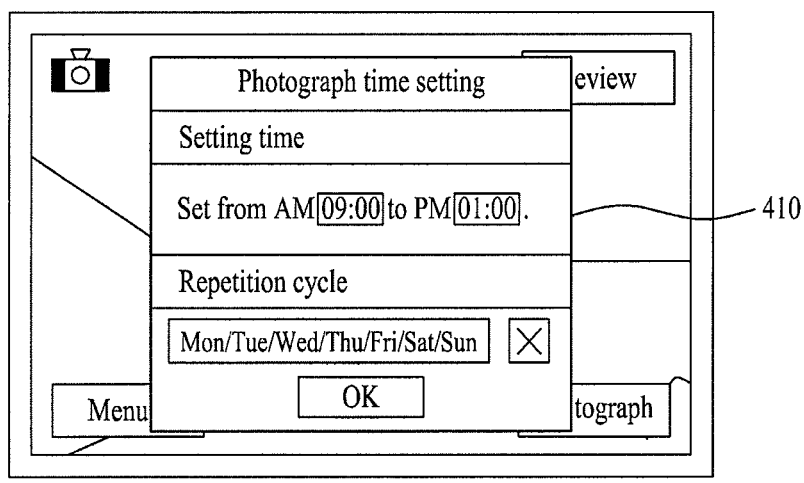
FIG. 4A and FIG. 4B are diagrams of screen configurations for setting a photograph time among image transmitting conditions according to the present invention.
Figure 4B:
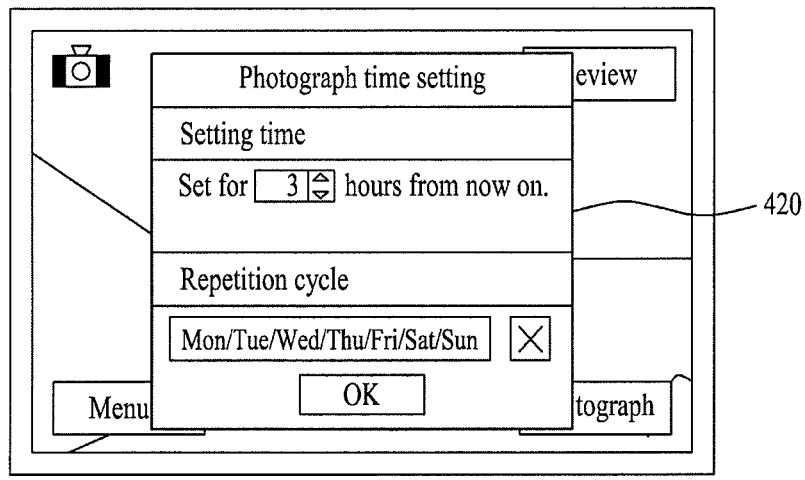
Figure 4B:
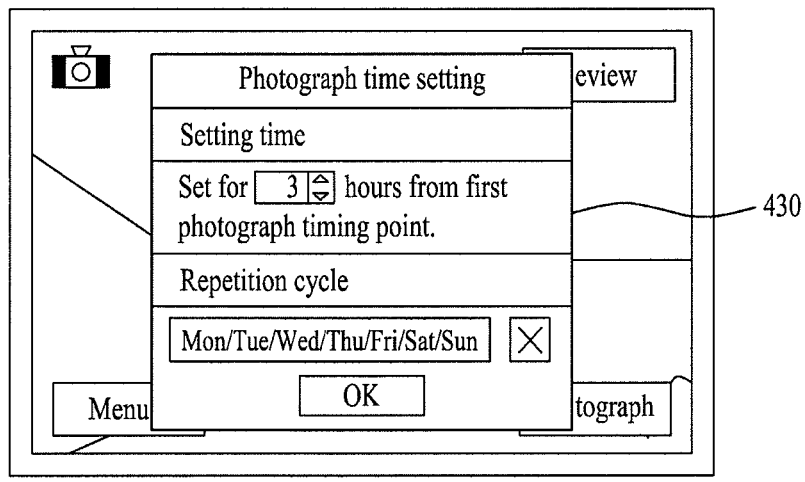

In the following description, a setting process is described per image transmission condition, FIG. 4A and FIG. 4B are diagrams of screen configurations for setting a photograph time among image transmitting conditions according to the present invention.

Referring to FIG. 4A, in case of receiving an input of a photograph time between A.M. 09:00 and P.M. 01:00 from a user, the mobile terminal 100 sets the photograph time to 'from A.M. 09:00 to P.M. 01:00' and is then able to transmit images photographed from A.M. 09:00 to P.M. 01:00 to a counterpart terminal. In this case, a start hour and an end hour of the photograph time can be freely designated by a user selection.

Moreover, the mobile terminal 100 is able to further set a cycle of repetition for the set photograph time.

For instance, in case that a repetition cycle is set for a specific day of the week, an interval of specific days of the week (e.g., Monday to Friday, Saturday to Sunday, etc.), a specific date or the like, the image transmission condition can be always set to the set photograph time on the specific day of the week, in the interval of the specific days of the week or on the specific date.

Referring to FIG. 4B (a), if a user inputs a photograph time amounting to 3 hours from now, the mobile terminal 100 sets the photograph time to the period of 3 hours from now and is then able to transmit images photographed during 3 hours from now to a counterpart terminal. In this case, the predetermined time interval from a present hour can be freely designated according to a user selection. And, the repetition cycle can refer to the former description with reference to FIG. 4A.

Referring to FIG. 4B (b), if a user inputs a photograph time amounting to 3 hours from a first photograph timing point, the mobile terminal 100 sets the photograph time to the period of 3 hours from the first photographing timing point and is then able to transmit images (the first photographed image included) photographed during 3 hours from the first photographing timing point to a counterpart terminal. In this case, the predetermined time interval from the first photographing timing point can be freely designated according to a user selection. And, the repetition cycle can refer to the former description with reference to FIG. 4A.

Figure 5A:
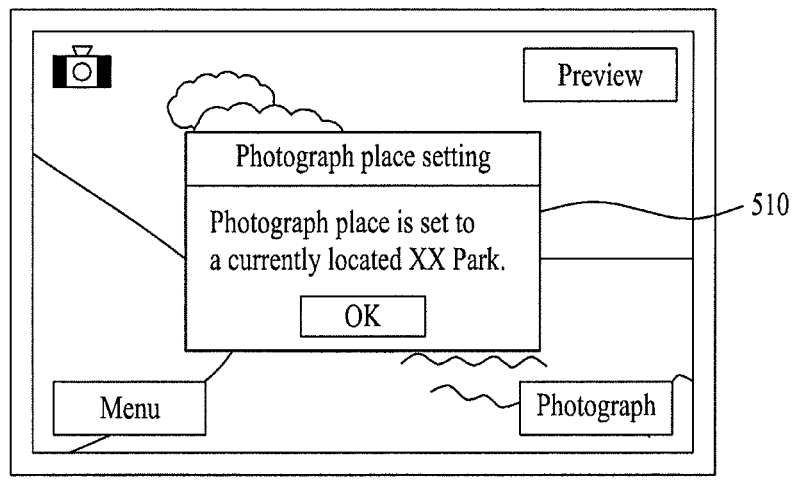
FIGS. 5A to 5C are diagrams of screen configurations for setting a photograph place among image transmitting conditions according to the present invention.
Figure 5A:
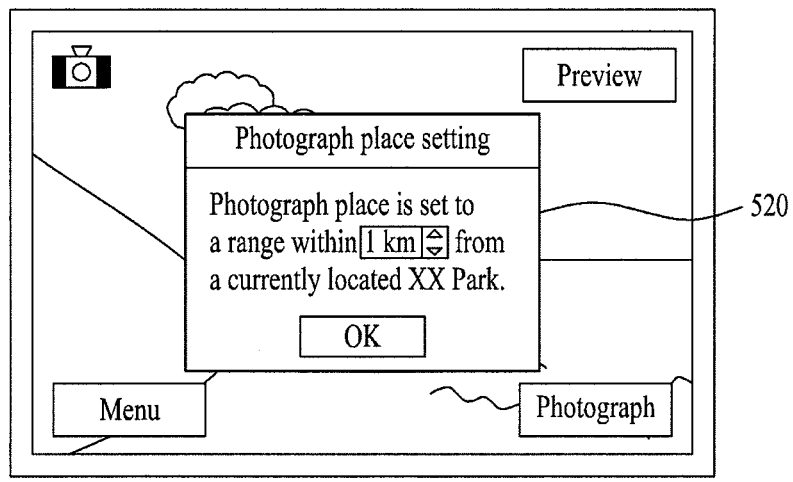
Figure 5B:
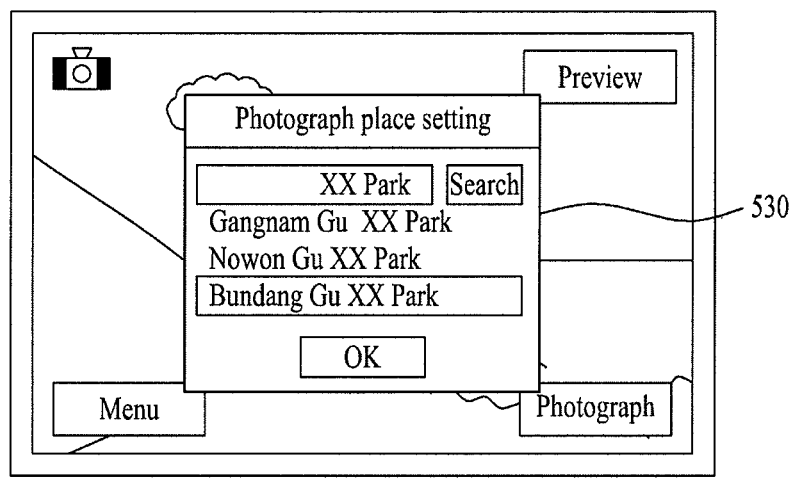
Figure 5B:
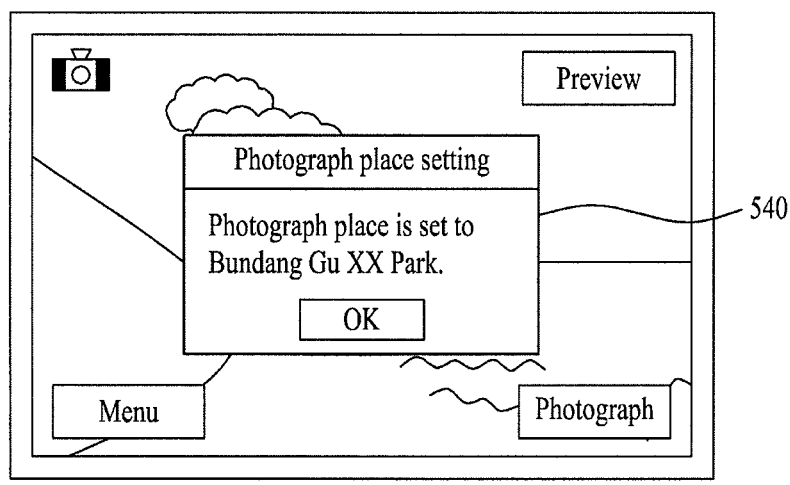
Figure 5C:
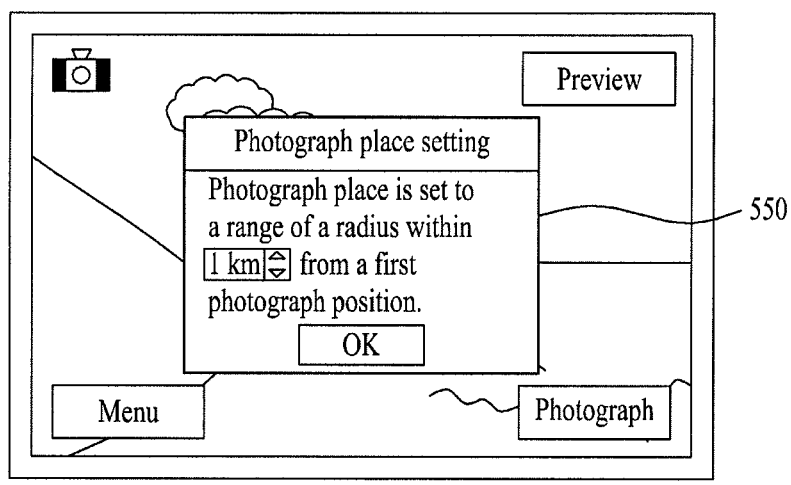

FIGS. 5A to 5C are diagrams of screen configurations for setting a photograph place among image transmitting conditions according to the present invention.

Referring to FIG. 5A (a), in case of receiving an input of a currently located place 'XX Park' as a photograph place from a user, the mobile terminal 100 sets the photograph place to 'XX Park' and is then able to transmit an image photographed at 'XX Park' to a counterpart terminal.

For instance, the mobile terminal 100 obtains its current position information (e.g., altitude/longitude/latitude information, coordinates information, speed information, etc.) using GPS and the like and is then able to determine an address, building, place, POI (point of interest) and the like on an administrative district corresponding to the obtained current position information as the currently located place.

Moreover, the mobile terminal 100 is able to set the photograph place to a specific partial place (e.g., OO restaurant in XX Park within the currently located place.

Referring to FIG. 5A (b), in case of receiving an input of "within a predetermined radius (e.g., 1 km) from a currently located place 'XX Park'" as a photograph place from a user, the mobile terminal 100 sets the photograph place to "within a predetermined radius from XX Park". The mobile terminal 100 is then able to transmit an image photographed within the predetermined radius from the XX Park to a counterpart terminal. In this case, the predetermined radius can be freely designated according to a user selection.

Referring to FIG. 5B, in case of receiving an input of a specific place from a user [a], the mobile terminal 100 sets a photograph place to the inputted specific place and is then able to transmit an image photographed at the specific place to a counterpart terminal.

In particular, the mobile terminal 100 is able to directly receive an input of a name or address of a specific place. Alternatively, in case of receiving an input of a keyword from a user, the mobile terminal 100 provides the user with places corresponding to the inputted keyword and then enables the user to select a place, which is to be set as a photograph place, from the places corresponding to the inputted keyword [FIG. 5B (a)].

Moreover, in case of receiving an input of a specific place and an input of a predetermined radius from the specific place from a user, the mobile terminal 100 sets a photograph place to a range within the predetermined radius from the specific place and is then able to transmit an image photographed within the predetermined radius from the specific place to a counterpart terminal.

Referring to FIG. 5C, in case of receiving an input of 'within a predetermined radius (e.g., 1 km) from a first photograph position' as a photograph place from a user, the mobile terminal 100 sets the photograph place to a range within the predetermined radius from the first photograph position and is then able to transmit an image photographed within the predetermined radius from the first photograph position to a counterpart terminal. In this case, the predetermined radius from the first photograph position can be freely designated according to a user selection.

FIGS. 6A to 6E are diagrams of screen configurations for setting a reception counterpart among image transmitting conditions according to the present invention.

Figure 6A:
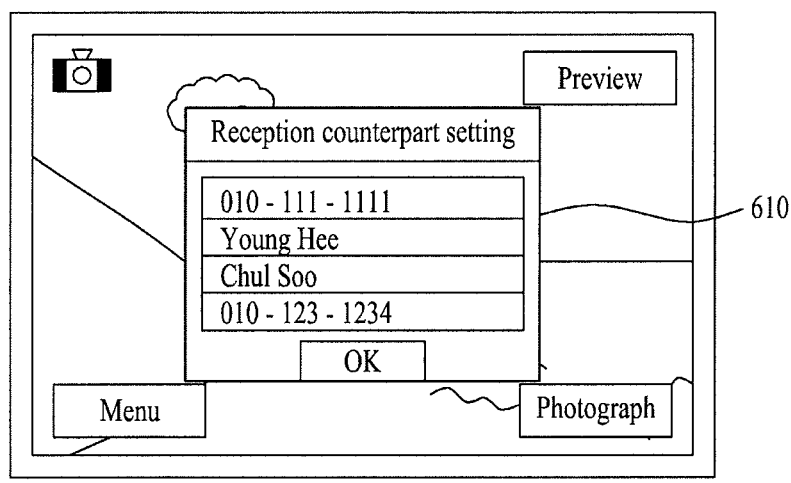
FIGS. 6A to 6E are diagrams of screen configurations for setting a reception counterpart among image transmitting conditions according to the present invention.

Referring to FIG. 6A, in case of directly receiving an input of an identity information (e.g., a phone number, a name registered with a phonebook, etc.) of a counterpart terminal, to which a reception counterpart shall be set, from a user, the mobile terminal 100 sets the reception counterpart to the counterpart terminal matching the inputted identity information and is then able to transmit a photographed image to the counterpart terminal matching the inputted identity information.

Figure 6B:
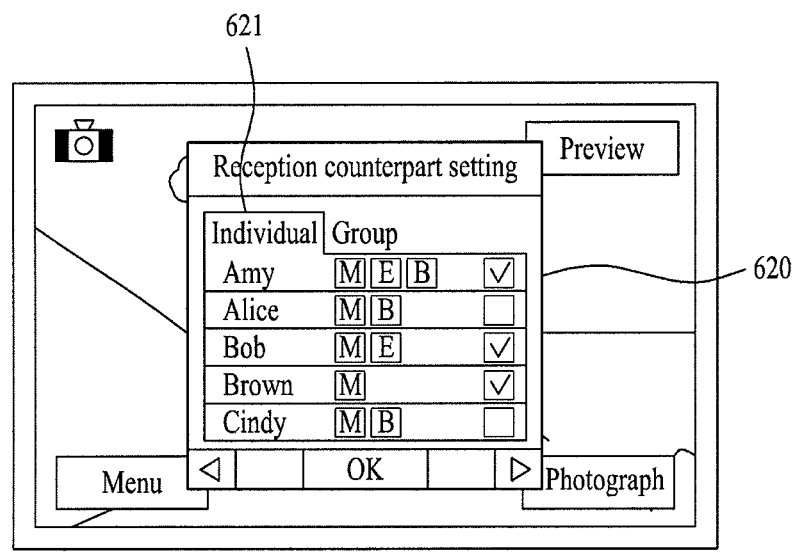
Figure 6B:
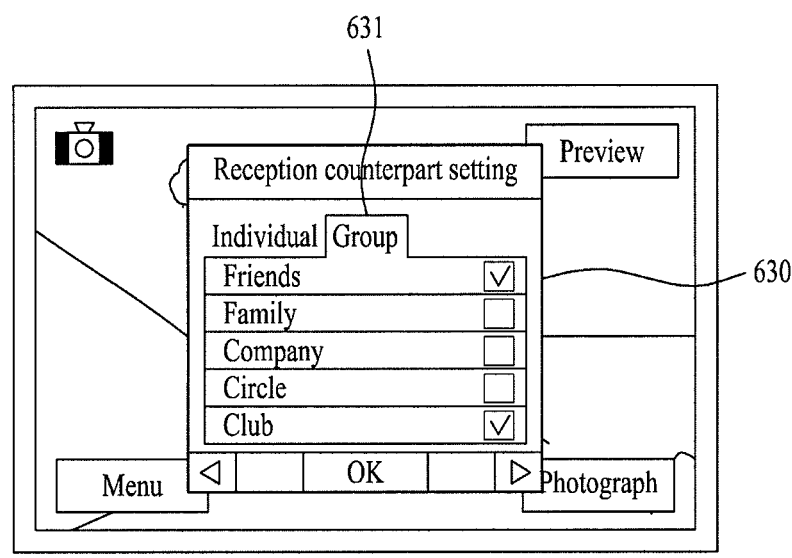

Referring to FIG. 6B, in case of receiving a selection of a counterpart terminal, to which a reception counterpart shall be set among a plurality of counterpart terminals registered with a phonebook, from a user, the mobile terminal 100 sets the reception counterpart to the selected counterpart terminal and is then able to transmit a photographed image to the selected counterpart terminal.

In particular, referring to FIG. 6B (a), if an individual setting tag 621 is selected, the mobile terminal 100 displays identity information of each of counterpart terminals registered with a phonebook and corresponding available transmission systems (e.g., "M" for messaging; "E" for email; and "B" for Bluetooth) and is then able to receive an input of a selection action on each of the counterpart terminals from a user. In FIG. 6B (a), it can be observed that Amy, Bob and Brown are selected as reception counterparts.

For instance, the transmission systems can include MMS (multimedia message service), email, Bluetooth, wireless internets (WiFi, HSPDA, WiBro, WiMax, etc.), infrared communication (IrDA) and the like.

Referring to FIG. 6B (b), if a group setting tag 631 is selected, the mobile terminal 100 displays groups registered with a phonebook and is then able to receive a selection action on a specific group from a user. In FIG. 6B (b), it can be observed that Friends and Club are selected as reception counterparts, respectively.

In this case, the group can indicate a community including at least one or more counterpart terminals registered with a phonebook. Therefore, the mobile terminal 100 is able to set reception counterparts to the counterpart terminal(s) belonging to the group selected by the selection action.

Moreover, referring to FIG. 6B (b), a transmission system available for each group can be displayed. In this case, the transmission system available per group can include a transmission system available in common with at least one counterpart terminal belonging to the corresponding group.

Figure 6C:
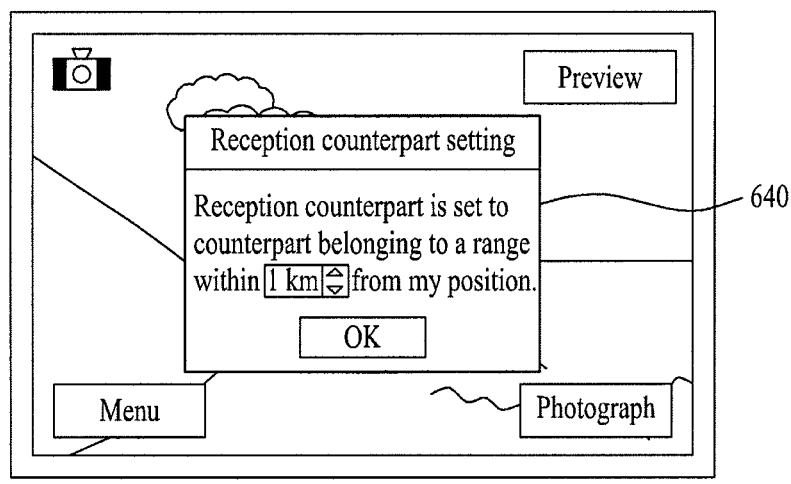

Referring to FIG. 6C, in case of receiving an input of a predetermined distance (e.g., 1 km) from a current terminal position from a user, the mobile terminal sets a reception counterpart to a counterpart terminal located in the predetermined distance from the current terminal position and is then able to transmit a photographed image to the counterpart terminal located in the predetermined distance from the current terminal position.

Moreover, the mobile terminal 100 receives position information of a counterpart terminal located in a predetermined distance from a current terminal position from an external server and is then able to display a position of the counterpart terminal on a preview screen based on the received position information. If a plurality of counterpart terminals exists, a user is able to directly select a specific counterpart terminal, to which a reception counterpart shall be set, from a plurality of the counterpart terminals using the counterpart positions displayed on the preview screen.

Figure 6D:
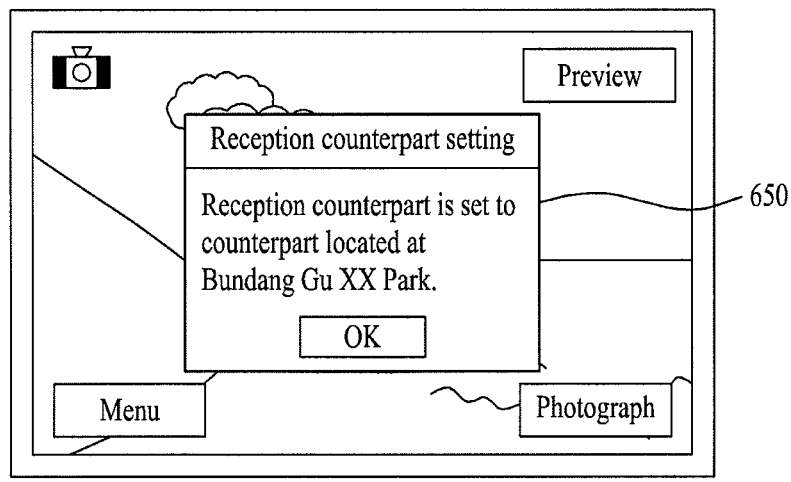

Referring to FIG. 6D, in case that a user inputs a specific place (e.g., XX Park, Bundang Gu) or a predetermined distance from the specific place, the mobile terminal 100 sets a reception counterpart to a counterpart terminal located at the specific place or within the predetermined distance from the specific place and is then able to transmit a photographed image to the counterpart terminal located at the specific place or within the predetermined distance from the specific place.

In this case, the specific place or the predetermined distance from the specific place can be freely set by the user.

Figure 6E:
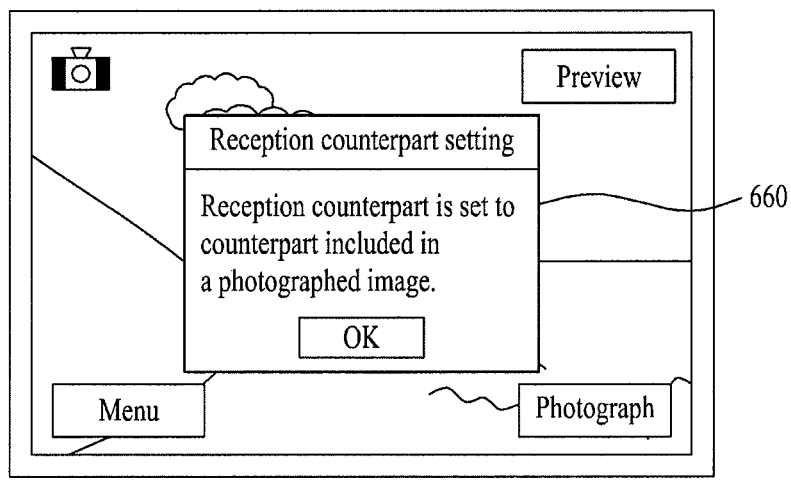

Referring to FIG. 6E, the mobile terminal 100 sets a reception counterpart to a counterpart terminal corresponding to a character object included in a photographed image and is then able to transmit the photographed image to the counterpart terminal corresponding to the character object.

For instance, the mobile terminal 100 searches a plurality of counterpart images corresponding to a plurality of counterpart terminals registered with a phonebook for a counterpart image approved to have the same identity of a character object included in a photographed image and is then able to set a reception counterpart to the counterpart terminal corresponding to the found counterpart image, under the control of the controller 180.

Alternatively, under the control of the controller 180, the mobile terminal 100 obtains counterpart information of a counterpart terminal carried by a counterpart corresponding to a character object included in a photographed image and is then able to set a reception counterpart to the counterpart terminal of which counterpart information is obtained. In this case, the counterpart information is received from the counterpart terminal in direct or can be received from such an external server as an SNS (social network system) server and the like.

FIGS. 7A to 7D are diagrams of screen configurations for setting an image transmission system among image transmitting conditions according to the present invention.

Figure 7A:
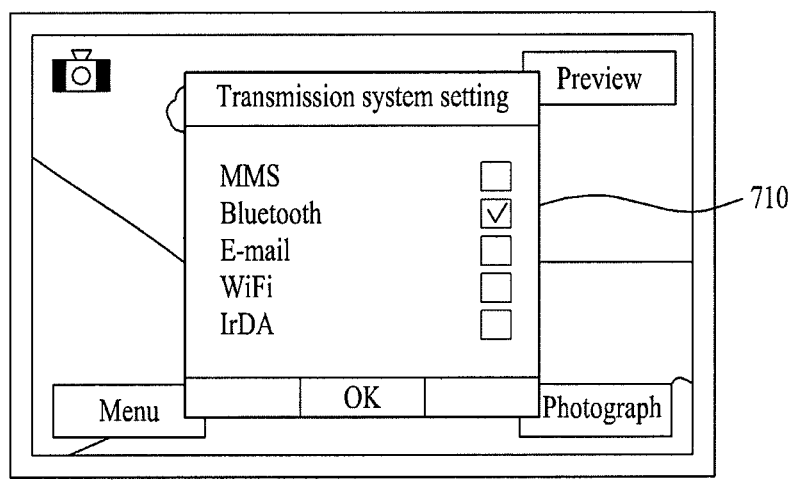
FIGS. 7A to 7D are diagrams of screen configurations for setting a image transmission system among image transmitting conditions according to the present invention.

Referring to FIG. 7A, the mobile terminal 100 displays a list 710 including available image transmission system on a screen and is then able to set a transmission system of an image photographed via the camera 121 to the image transmission system selected by a user from the image transmission systems included in the list 710. Therefore, the mobile terminal 10 is able to transmit a photographed image to a counterpart terminal using the set image transmission system.

For instance, the image transmission systems can include MMS (multimedia message service), email, Bluetooth, WiFi, infrared communication (IrDA) and the like.

Figure 7B:
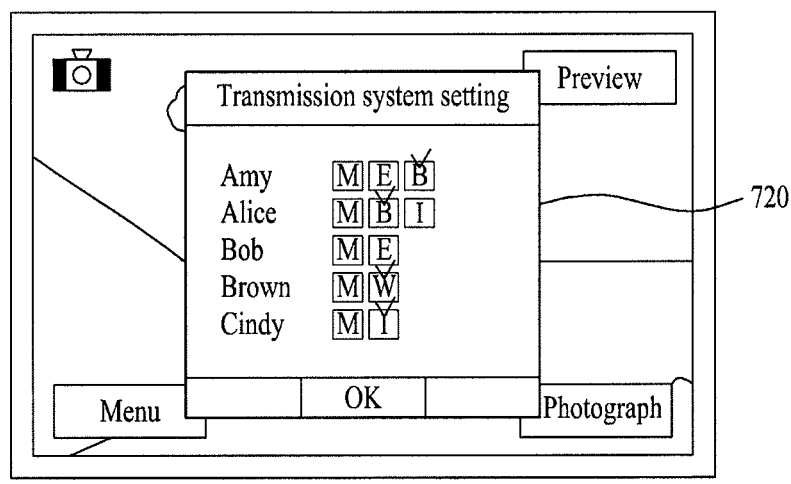

Referring to FIG. 7B, the mobile terminal 100 is able to set an image transmission system per counterpart terminal to receive an image. For instance, Bluetooth is set for Amy or Alice (i.e., "B"). WiFi is set for Brown (i.e., "W"). And, Infrared communication (R) can be set for Cindy (i.e., "I").

In doing so, in order help user's selection, the mobile terminal is able to display an image transmission system available for counterpart terminal (e.g., Bluetooth_B, MMS_M, Email_E, WiFi_W, IrDA_I, etc.). For instance, in case that Bluetooth address of a counterpart terminal is stored in the mobile terminal 100, the mobile terminal 100 may be able to perform Bluetooth communication with the corresponding counterpart terminal. Moreover, information on the image transmission system available per counterpart terminal can be stored in the memory 160.

Therefore, the mobile terminal 100 is able to transmit a photographed image to a corresponding counterpart terminal using the image transmission system set for each counterpart terminal.

Figure 7C:
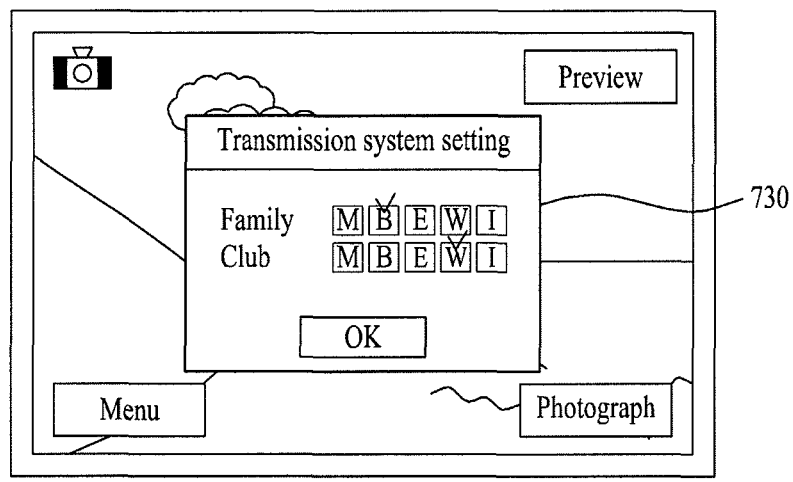

Referring to FIG. 7C, the mobile terminal 100 is able to set an image transmission system per group to receive an image. In this case, the group can include at least one or more counterpart terminals. For instance, Bluetooth (B) is set for the group Family. And, WiFi (W) can be set for the group Club.

In doing so, in order to help a user's selection, the mobile terminal is able to display an image transmission system available per group. For instance, the image transmission system available per group can include an image transmission system available in common with at least one counterpart terminal belonging to a corresponding group or an image transmission system available for at least one of the at least one or more counterpart terminals belonging to the corresponding group.

Therefore, under the control of the controller 180, the mobile terminal 100 is able to transmit a photographed image to at least one counterpart terminal belonging to a corresponding group using the image transmission system set for the corresponding group.

Figure 7D:
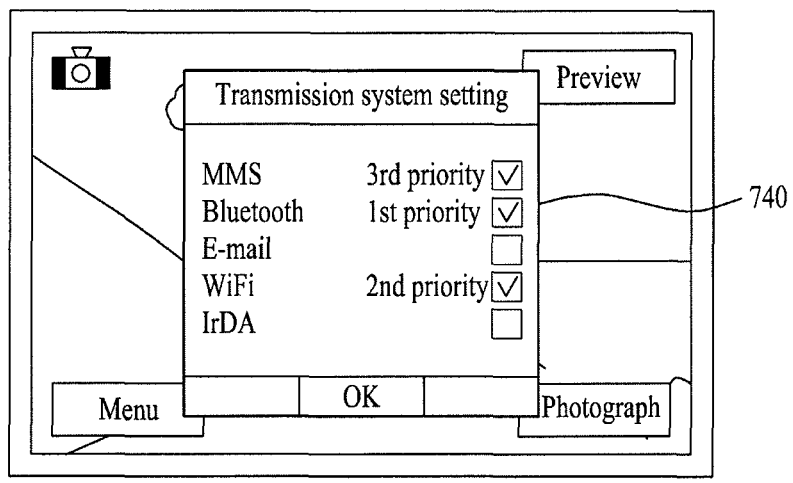

Referring to FIG. 7D, in case of setting a plurality of image transmission systems, the mobile terminal 100 is able to set priorities for a plurality of the set image transmission systems, respectively. For instance, a first priority is set for Bluetooth, a second priority is set for WiFi, and a third priority can be set for MMS.

Therefore, under the control of the controller 180, if the mobile terminal 100 fails in an image transmission using an image transmission system having a high priority, the mobile terminal 100 is able to transmit an image using an image transmission system having a lower priority.

For instance, if the mobile terminal 100 fails in an image transmission using Bluetooth of the first priority, the mobile terminal 100 is able to try the image transmission again using WiFi of the second priority. If the mobile terminal 100 fails in the image transmission using WiFi of the second priority, the mobile terminal 100 is able to try the image transmission again using MMS of the third priority.

Figure 8A:
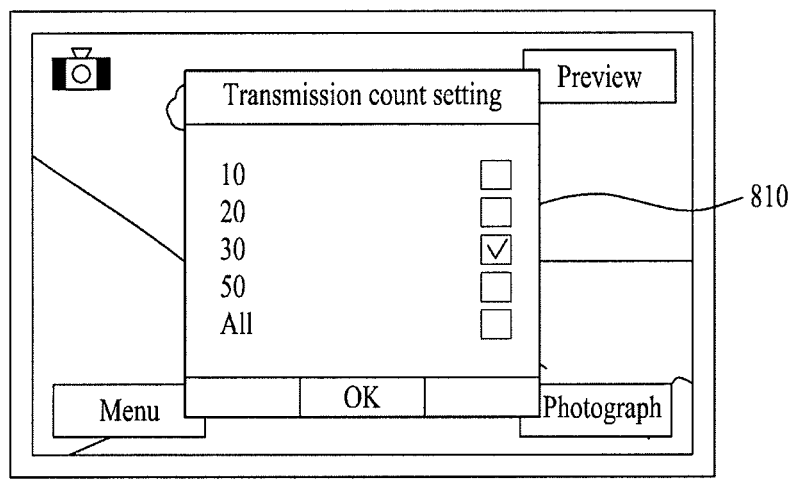
FIG. 8A and FIG. 8B are diagrams of screen configurations for setting an image transmission count among image transmitting conditions according to the present invention.
Figure 8B:
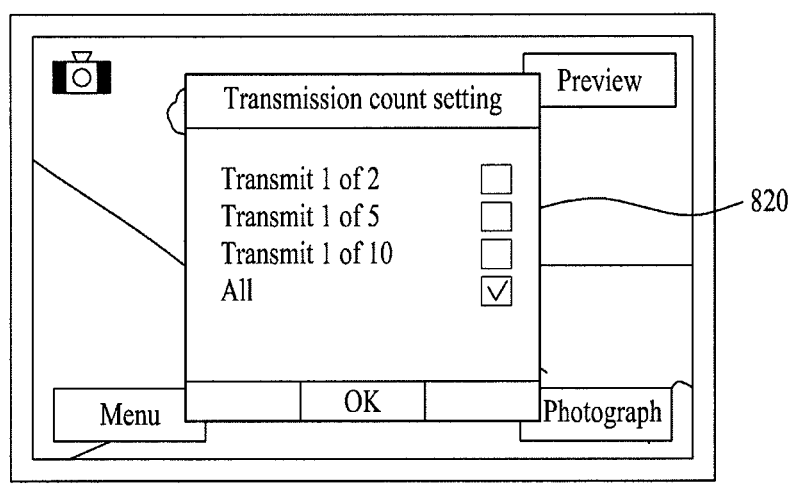

FIG. 8A and FIG. 8B are diagrams of screen configurations for setting an image transmission count among image transmitting conditions according to the present invention.

Referring to FIG. 8A, the mobile terminal 10 is able to set a count (hereinafter named an image transmission count) of images to transmit to a counterpart terminal according to a user selection. Therefore, the mobile terminal 100 is able to transmit images amounting to the set image transmission count to the counterpart terminal under the control of the controller 180.

For instance, in case that the image transmission count is set to 30, although the count of the photographed images exceeds 30, the mobile terminal 100 transmits the $1^{st}$ to $30^{th}$ images and may not transmit the $31^{st}$ photographed image and more.

Moreover, if the image transmission count is set to 'all', the mobile terminal 100 is able to transmit all photographed images to the counterpart terminal (i.e., the image transmission count is equal to infinite.)

Referring to FIG. 8B, the mobile terminal 100 is able to set an image transmission cycle based on the number of images according to a user selection. Therefore, the mobile terminal 100 is able to transmit a photographed image to a counterpart terminal by the set image transmission cycle under the control of the controller 180.

For instance, if the image transmission cycle is set to '1 of 2 transmissions', the mobile terminal 100 is able to transmit one of $n^{th}$ and $(n+1)^{th}$ photographed images. In this case, the transmitted one of the two images is directly selected by a user, is randomly selected by the controller 180 (e.g., the selection with reference to an image having a better quality, an image having a clearer focus, etc.), or is selected in photographing order (e.g., an image photographed later).

Moreover, if the image transmission cycle is set to 'all', the mobile terminal 100 is able to transmit all photographed images (image transmission cycle is 'transmit 1 of 1').

In FIG. 8A or FIG. 8B, the image transmission count or the image transmission cycle can be set variously according to a user selection. Besides, in case that there is a plurality of counterpart terminals to receive images, the image transmission count or the image transmission cycle can be set for each of a plurality of the counterpart terminals.

Figure 9A:
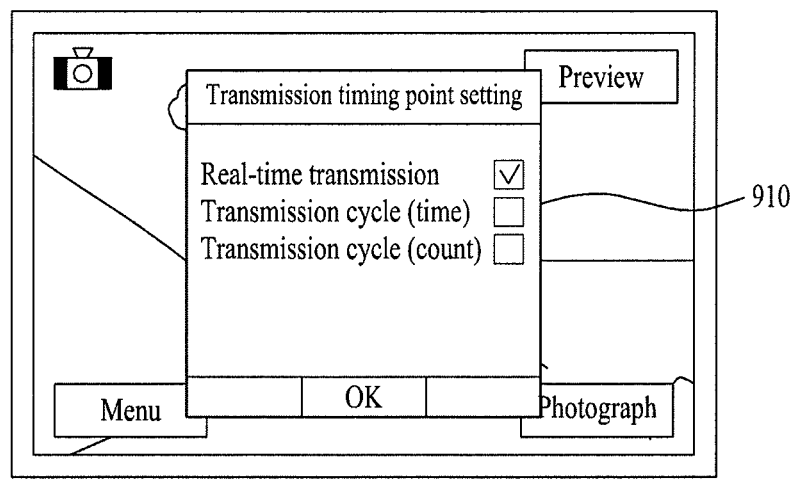
FIGS. 9A to 9C are diagrams of screen configurations for setting an image transmission timing point among image transmitting conditions according to the present invention.
Figure 9B:
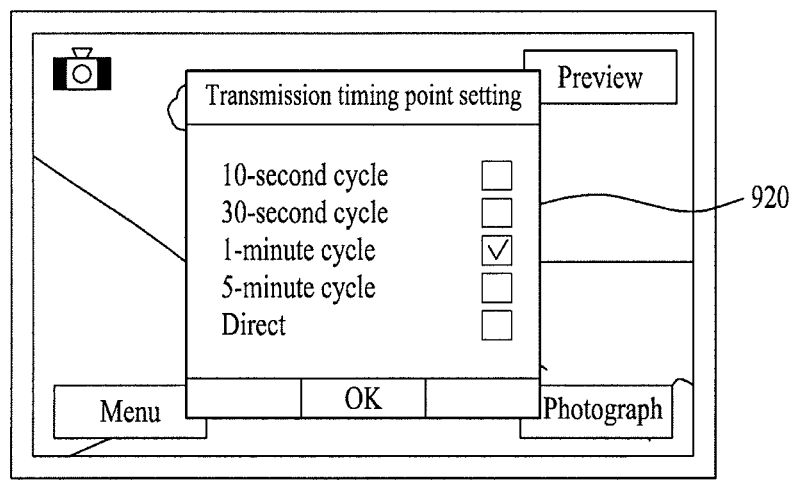
Figure 9C:
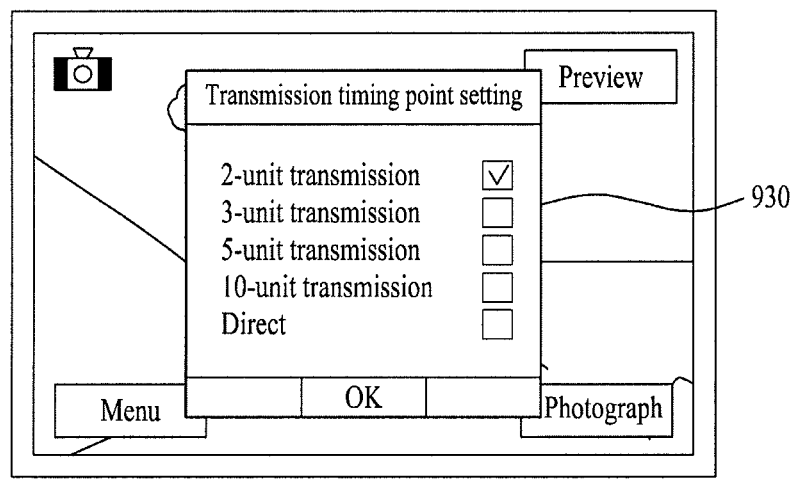

FIGS. 9A to 9C are diagrams of screen configurations for setting an image transmission timing point among image transmitting conditions according to the present invention.

Referring to FIG. 9A, the mobile terminal 100 is able to set an image transmission timing point according to a user selection. Therefore, the mobile terminal 100 is able to transmit a photographed image to a counterpart terminal to correspond to the set image transmission timing point under the control of the controller 180.

For instance, if the image transmission timing point is set to 'real-time transmission', the mobile terminal 100 photographs an image using the camera 121 and is then able to immediately transmit the photographed image to a counterpart terminal.

Referring to FIG. 9B, if the image transmission timing point is set to a transmission cycle (time) in FIG. 9A, the mobile terminal 100 is able to set an image transmission cycle based on a time according to a user selection. Therefore, the mobile terminal 100 is able to transmit a photographed image by the time cycle corresponding to the set image transmission cycle under the control of the controller 180.

For instance, if the image transmission cycle is set to 1-minute cycle, the mobile terminal 100 is able to transmit a photographed image in 1-minute cycle to a counterpart terminal. In particular, assuming that the mobile terminal 100 performs an image transmission at 09:00:00, the mobile terminal 100 is able to transmit images photographed between 09:00:00 and 09:01:00 at 09:01:00.

Referring to FIG. 9C, if the image transmission timing point is set to a transmission cycle (count) in FIG. 9A, the mobile terminal 100 is able to set an image transmission cycle based on a count according to a user selection. Therefore, the mobile terminal 100 is able to transmit images photographed in the count cycle corresponding to the set image transmission cycle under the control of the controller 180.

For instance, if the image transmission cycle is set to 2-unit transmission, the mobile terminal 100 is able to transmit photographed images by unit of 2 to a counterpart terminal. In particular, instead of directly transmitting a first image (i.e., 1 image) by a first photographing, if a second image is photographed by a second photographing, the mobile terminal 100 is able to transmit both of the first and second images (i.e., 2 images) together.

Meanwhile, even if the mobile terminal 100 executes a menu item corresponding to an image transmission condition setting before entry into a camera photograph mode, the mobile terminal 100 is able to display the image transmission condition setting screens shown in FIGS. 3A to 9C. For instance, the image transmission condition setting screens can be displayed if the menu item corresponding to the image transmission condition setting is selected and executed via the menu search in a standby mode.

Referring now to FIG. 2, the mobile terminal 100 is able to display the image transmission condition set in the setting mode 210 on the preview screen via the display module 151 in the camera photograph mode under the control of the controller 180. Meanwhile, the mobile terminal 100 is able to stop displaying the image transmission condition according to a user selection.

After the camera photograph mode has been entered, the mobile terminal 100 automatically displays the image transmission condition on the preview screen. Alternatively, after the camera photograph mode has been entered, if a user inputs a command for displaying the image transmission condition, the mobile terminal 100 is able to display the image transmission condition on the preview screen.

In displaying the image transmission condition, the mobile terminal 100 partitions the screen into a plurality of regions and then displays the preview screen and the image transmission condition of the first region and the second region, respectively. Alternatively, the mobile terminal 100 is able to display the preview screen and the image transmission condition in a manner of the preview screen is overlapped with the image transmission condition. In particular, in case of the overlapped display, the image transmission condition is displayed on the overlapped part. And, whether to display the preview screen corresponding to the overlapped part can be adjusted by controlling a transparency level of the overlapped part. Alternatively, a display level of the preview screen corresponding to the overlapped part can be adjusted by controlling a transparency level of the overlapped part.

The display condition for the image transmission condition is set by a user or can be randomly set by the controller 180.

For instance, the display condition for the image transmission condition can include a display position, a display size (area), an image transmission condition to be displayed on the preview screen in case of plural image transmission conditions (e.g., reception counterpart, photograph time, photograph place, image transmission system, image transmission timing point, etc.), a text color/size/pattern and the like.

In the following description, an image transmission condition display on a preview screen is explained in detail with reference to FIG. 10A.

FIGS. 10A to 10E are diagrams of screen configurations for displaying preset image transmission conditions on a preview screen according to the present invention.

Figure 10A:
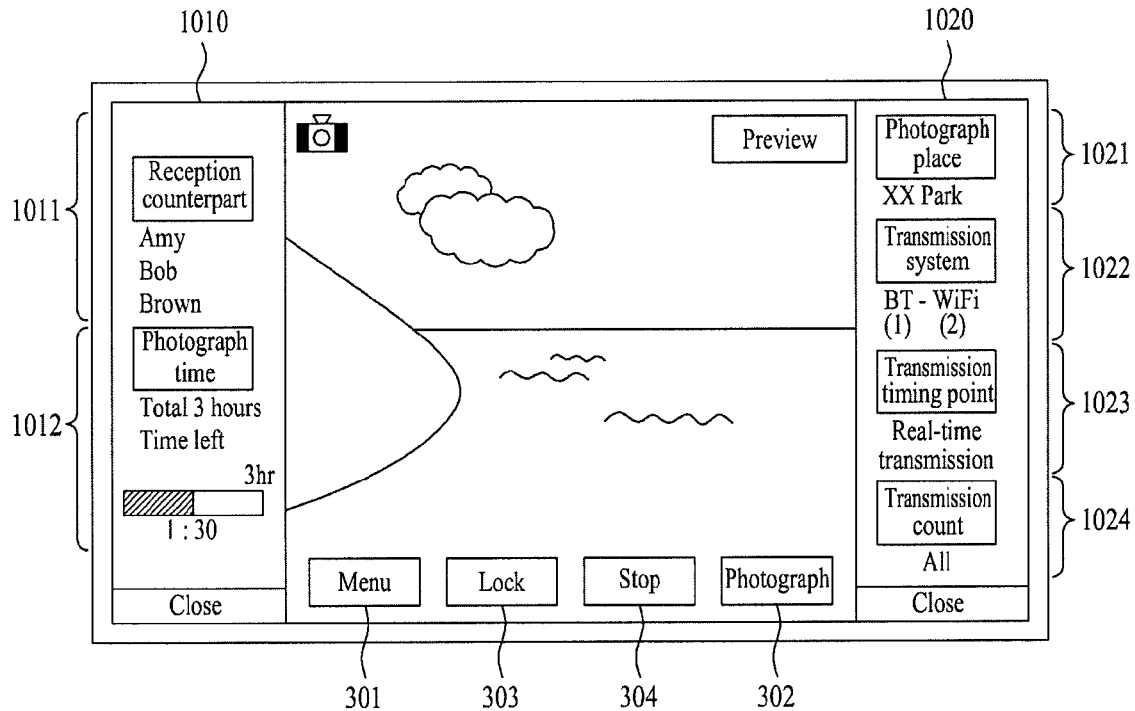

Referring to FIG. 10A, the mobile terminal 100 provides a preview screen with regions (hereinafter named condition regions) 1010 and 1020 for an image transmission condition display. The mobile terminal 100 is able to display an image transmission condition within the corresponding condition region.

For instance, information on a reception counterpart 1011 and information on a photograph time 1012 are displayed on the condition region 1010. And, information on a photograph place 1021, information on an image transmission system 1022, information on an image transmission timing point 1023 and information on an image transmission count 1024 can be displayed on the condition region 1020.

In particular, according to the information on the reception counterpart 1011, it can be observed that reception counterparts are set to Amy, Bob and Brown. According to the information on the photograph time 1012, it can be observed that a total photograph time is 3 hours. An, it can be also observed that 1 hour and 30 minutes is currently left.

According to the information on the photograph place 1021, it can be observed that the photograph place is set to XX Park. According to the information on the image transmission system 1022, it can be observed that the image transmission system is set to Bluetooth of $1^{st}$ priority and WiFi of $2^{nd}$ priority.

According to the information on the image transmission timing point 1023, it can be observed that the image transmission timing point is set to real-time transmission. According to the information on the image transmission count 1024, it can be observed that the image transmission count is set to all images (infinite).

Of course, the mobile terminal 100 is able to stop the display of the image transmission condition according to a user selection entirely or in part. Alternatively, if the mobile terminal 100 performs the display of the image transmission condition in a predetermined time cycle (e.g., performing a display for 1 minute once in 30 minutes) or a user selects a display of the image transmission condition, the mobile terminal 100 performs the display of the image transmission condition and is then able to automatically stop the display of the image transmission condition after elapse of a predetermined time.

Referring now to FIG. 2, under the control of the controller 180, the mobile terminal 100 photographs an externally inputted image using the camera 121 in the camera photograph mode [S220]. In this case, the photographing step S220 can be performed while the image transmission condition is displayed on the preview screen.

Under the control of the controller 180, the mobile terminal checks the image transmission condition set in the setting step S210 in case of performing the image photographing S220 using the camera 121 [S230].

In the checking step S230, under the control of the controller 180, the mobile terminal 100 is able to check whether the set image transmission condition is suitable for the photographed image.

For instance, if the image transmission condition is set to the photograph place 'XX Park', it is able to check that the photograph of the photographed image is the XX Park. If the image transmission condition is set to 'AM 09:00 to PM 11:00', it is able to check that the photograph hour of the photographed image belongs to a range between AM 09:00 and PM 11:00.

Under the control of the controller 180, the mobile terminal 100 transmits the image, which was photographed in the photographing step S220 to correspond to the image transmission condition checked in the checking step S230, to each of at least one or more counterparts [S240]. In this case, the transmitting step S240 can be performed by the wireless communication unit 110.

The mobile terminal 100 enables access information of each of the at least one or more counterpart terminals to be stored in the memory 160. The mobile terminal 100 is able to transmit the photographed image to each of the at least one or more counterpart terminals using the stored access information under the control of the controller 180.

For instance, the access information can include a terminal identity number (e.g., a phone number, etc.), Bluetooth address information, email address information, IP address information and the like.

In the transmitting step S240, the mobile terminal 100 is able to use components corresponding to the image transmission system among a plurality of components included in the wireless communication unit 110.

For instance, in case that the image transmission system is Bluetooth or IrDA, the short range communication module 114 is used. If the image transmission system is MMS, the mobile communication module 112 is used. If the image transmission system is WiFi or Email, the wireless interne module is used.

In the transmitting step S240, if the checked image transmission condition is a specific photograph time, the mobile terminal 100 is able to transmit at least one image photographed for the specific photograph time under the control of the controller 180.

In the transmitting step S240, if the checked image transmission condition is a specific photograph place, the mobile terminal is able to transmit at least one image photographed at the specific photograph place under the control of the controller 180.

In the transmitting step S240, if the checked image transmission condition is a specific counterpart terminal, the mobile terminal 100 is able to transmit at least one photographed image to the specific counterpart terminal under the control of the controller 180.

In the transmitting step S240, if the checked image transmission condition is a real-time transmission, the mobile terminal 100 transmits an image as soon as the image is photographed. If the checked transmission condition is a transmission by a predetermined count unit, after the predetermined count of the photographed images are accumulated, the mobile terminal 100 transmits all of the photographed images at a time. If the checked image transmission condition is a transmission by a predetermined time unit, the mobile terminal 100 transmits images photographed for the predetermined time at a time periodically. If the checked image transmission condition is a transmission in case of a transmission command input, the mobile terminal is able to transmit a photographed image only if a transmission command is inputted by a user.

In the transmitting step S240, the mobile terminal 100 is able to transmit the image photographed in the photographing step S220 to each of the at least one or more counterpart terminals in direct without passing through the external server. For instance, P2P (peer to peer) communication is applicable to the transmitting step S240.

In the transmitting step S240, if the image transmission condition is set in a manner of setting priorities for a plurality of image transmission systems, respectively, the mobile terminal 100 first tries a first image transmission by the image transmission system having a highest priority. If the mobile terminal 100 fails in the first image transmission, the mobile terminal 100 is able to try a second image transmission by the image transmission system having the second highest priority.

The photographing step S220 and the transmitting step S240 are explained in detail with reference to FIGS. 10A to 11D as follows.

First of all, key zones displayed on the preview screen and functions of the displayed key zones are described with reference to FIG. 10A and FIG. 10B as follows.

Referring to FIG. 10A, the mobile terminal 100 is able to display a plurality of key zones including a menu zone 301, a photograph zone 302, a lock zone 303 and a stop zone 304.

If the photograph zone 302 is selected, the mobile terminal 100 photographs an image currently displayed on the preview screen and are then able to transmit the photographed image to a counterpart terminal. In particular, if an auto mode is set, as soon as an image is photographed, the mobile terminal 100 immediately transmits the photographed image to a counterpart terminal [cf. FIG. 10B]. If a semi-auto mode is et, after an image has been photographed, only if a user inputs an image transmission command, the mobile terminal 100 is able to transmit the photographed image to a counterpart terminal [cf. FIG. 10D and FIG. 10E].

If the lock zone 303 is selected before or after an image photographing, the mobile terminal 100 may not transmit the photographed image. Yet, an image photographed thereafter can be transmitted to correspond to an image transmission condition.

If the stop region 304 is selected, the mobile terminal 100 stops the image transmitting operation and may not transmit images photographed thereafter.

Figure 10B:
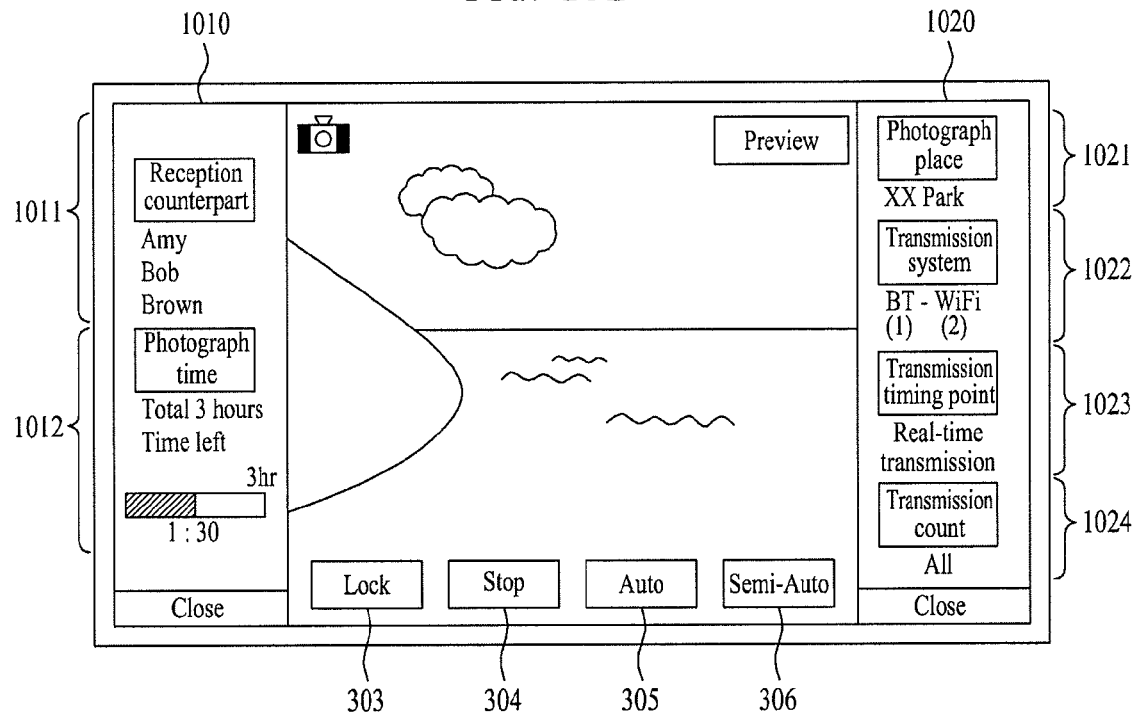

Referring to FIG. 10B, the mobile terminal 100 is able to display an auto photograph zone 305 and a semi-auto photograph zone 306 as key zones differing from those shown in FIG. 10A.

If the auto photograph zone 305 is selected, the mobile terminal 100 photographs an image currently displayed on the preview screen and is then able to immediately transmit the photographed image to a counterpart terminal according to the auto mode.

If the semi-auto photograph zone 306 is selected, the mobile terminal photographs an image currently displayed on the preview screen and then enables a user to select whether to transmit the photographed image. Only if the user inputs a transmission command, the mobile terminal 100 is able to transmit the photographed image to a counterpart terminal.

In the following description, a process for displaying an image transmission status is explained with reference to FIGS. 10C to 10E.

Referring to FIG. 10C, if the photograph zone 302 is selected in FIG. 10A (assuming that the auto mode is set) or the auto photograph zone 305 is selected in FIG. 10B, the mobile terminal 100 is able to directly transmit a currently photographed image to Amy, Bob and Brown (cf. 1011) set as the reception counterparts using Bluetooth (cf. 1022) set to $1^{st}$ priority of the image transmission system.

In particular, referring to FIG. 10C, the mobile terminal 100 is able to display a window 1030 including a text and an indicator on the preview screen. In this case, the text indicates that the image transmission to Amy, Bob and Brown is in progress. And, the indicator indicates an extent of the transmission progress.

Referring to FIG. 10D, if the photograph zone 302 is selected in FIG. 10A (assuming that the semi-auto mode is set) or the semi-auto photograph zone 306 is selected in FIG. 10B, the mobile terminal 100 is able to display a window 1040 for enabling a user to select whether to transmit a currently photographed image.

If 'transmit (yes)' is selected in FIG. 10D, the mobile terminal 100 is able to transmit the currently photographed image to Amy, Bob and Brown (cf. 1011) set as the reception counterparts using Bluetooth (cf. 1022) set to $1^{st}$ priority of the image transmission system.

Figure 10E:
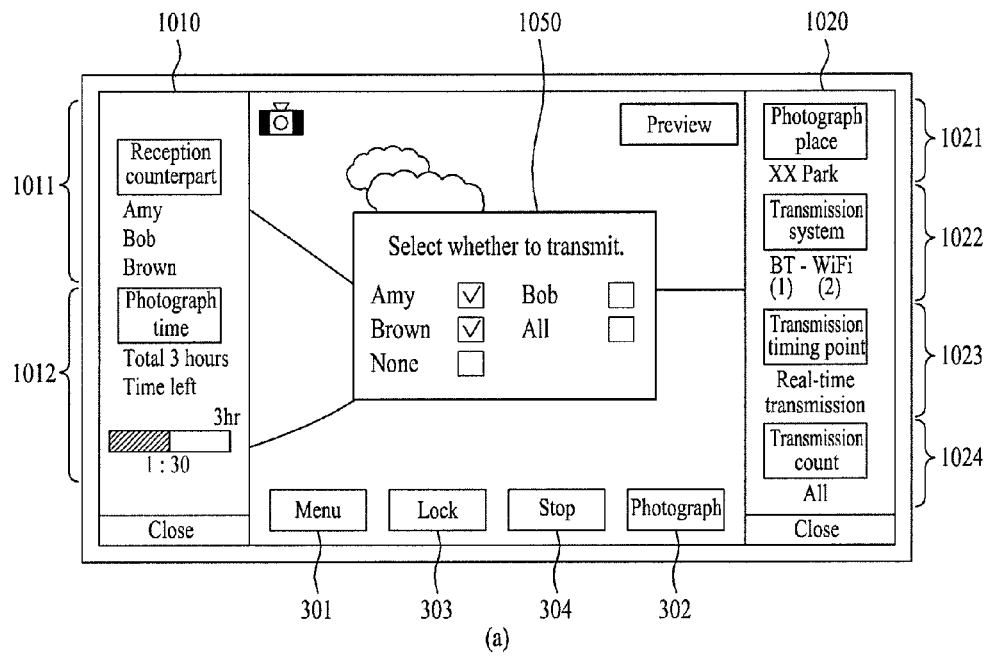
Figure 10E:
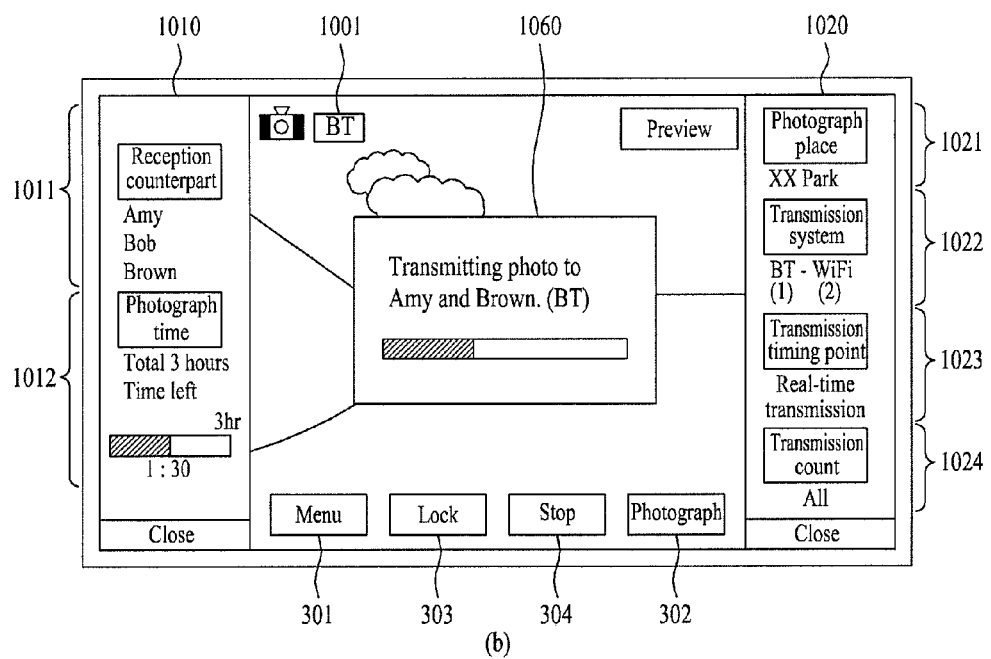

Moreover, referring to FIG. 10E, if 'transmit (yes) is selected in FIG. 10D, the mobile terminal 100 is able to display a window 1050 for enabling a user to select counterpart(s) to receive the currently photographed image from Amy, Bob and Brown (cf. 1011) set as the reception counterparts [a].

If Amy and Brown are selected the counterparts to receive the currently photographed image in FIG. 10E (a), the mobile terminal 100 is able to transmit the currently photographed image to Amy and Brown using Bluetooth (cf. 1022) set to $1^{st}$ priority of the image transmission system.

In particular, referring to FIG. 10E (b), the mobile terminal 100 is able to display a window 1060 including a text and an indicator on the preview screen. In this case, the text indicates that the image transmission to Amy and Brown is in progress. And, the indicator indicates an extent of the transmission progress.

Besides, in order to indicate that the image transmission is in progress, an image, an icon, an audio, an alarm sound, an alarm vibration and/or the like is available as well as the text.

In the following description, the process for displaying the image transmission status is further explained with reference to FIGS. 11A to 11D.

FIGS. 11A to 11D are diagrams of screen configurations for displaying an image transmission status on a preview screen according to the present invention.

Figure 11A:
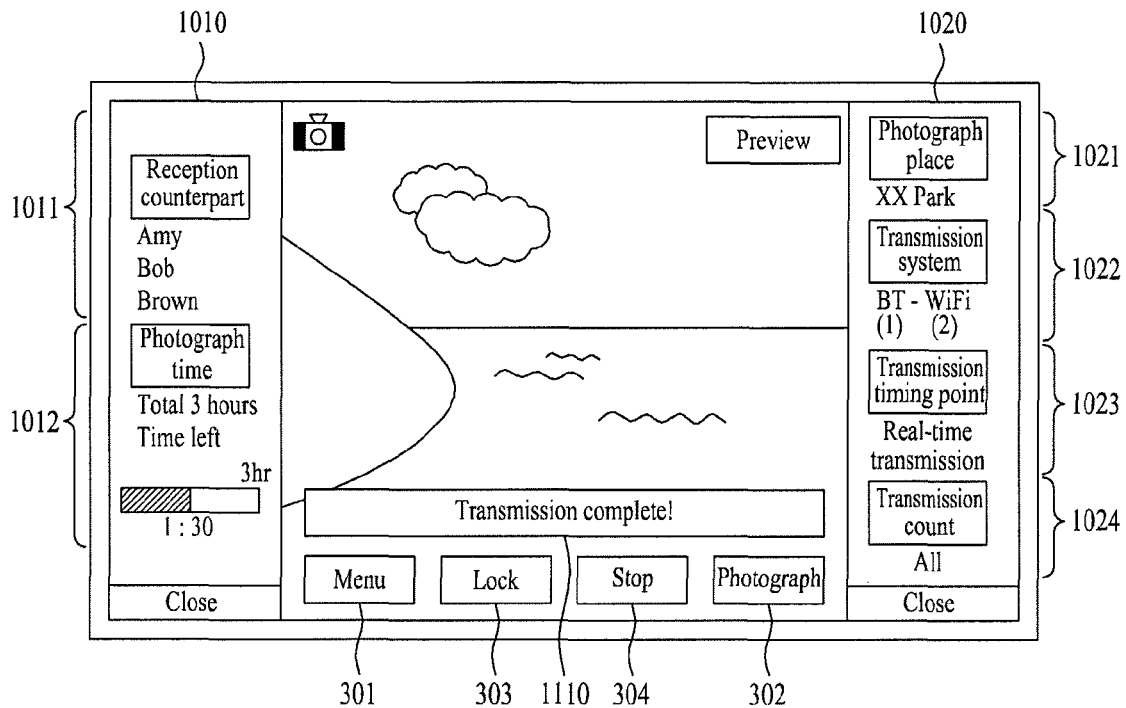
FIGS. 11A to 11D are diagrams of screen configurations for displaying an image transmission status on a preview screen according to the present invention.

Referring to FIG. 11A, in case that a transmission of a currently photographed image is completed, the mobile terminal 100 is able to display a text 1110 indicating the transmission completion on a prescribed region of the preview screen. Optionally, in order to indicate the transmission completion, an image, an icon, an audio, an alarm sound, an alarm vibration and/or the like is available as well as the text.

Figure 11B:
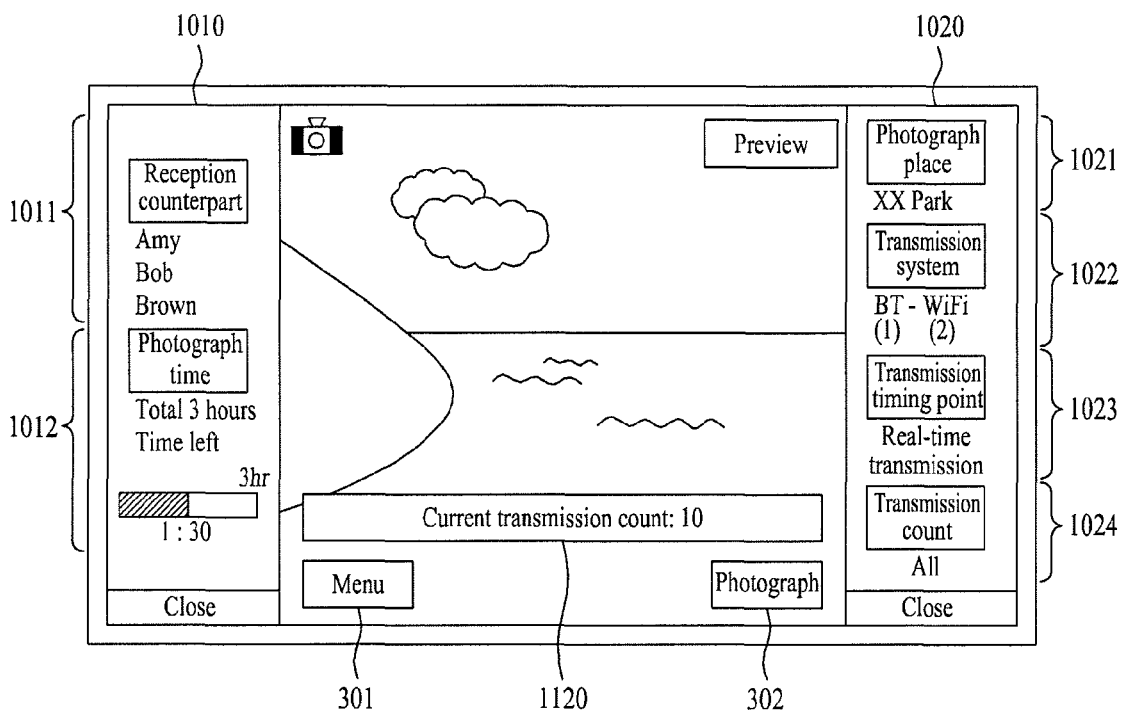

Referring to FIG. 11B, the mobile terminal 100 is able to display a text 1120 indicating a count of images transmitted so far on a prescribed region of the preview screen.

Figure 11C:
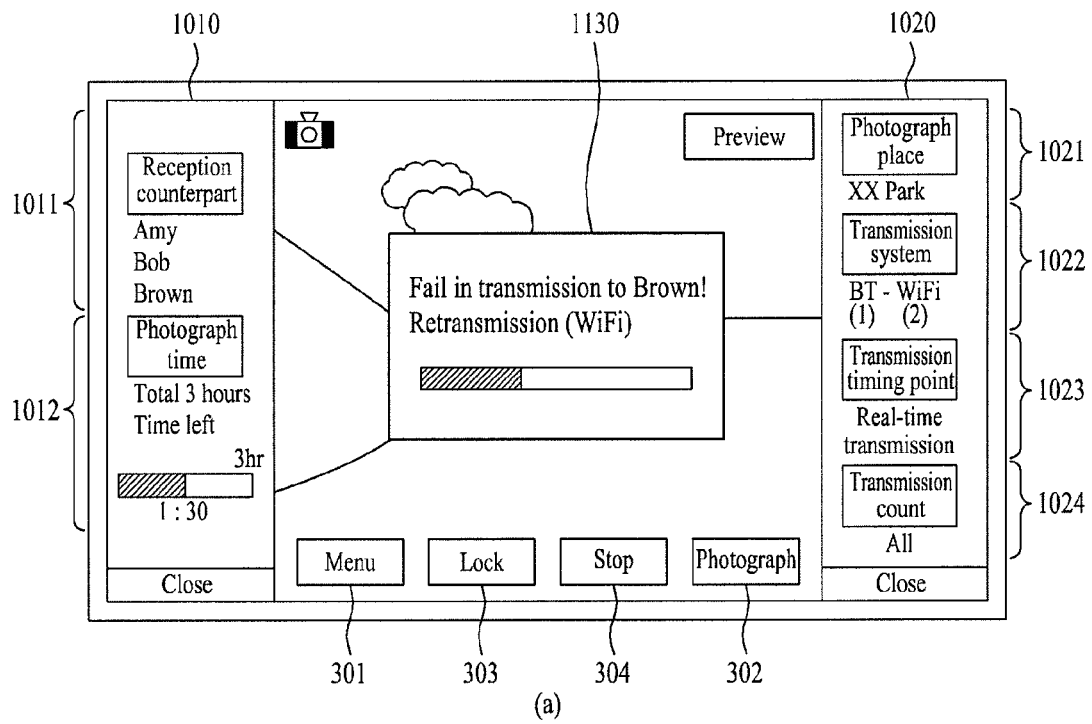
Figure 11C:
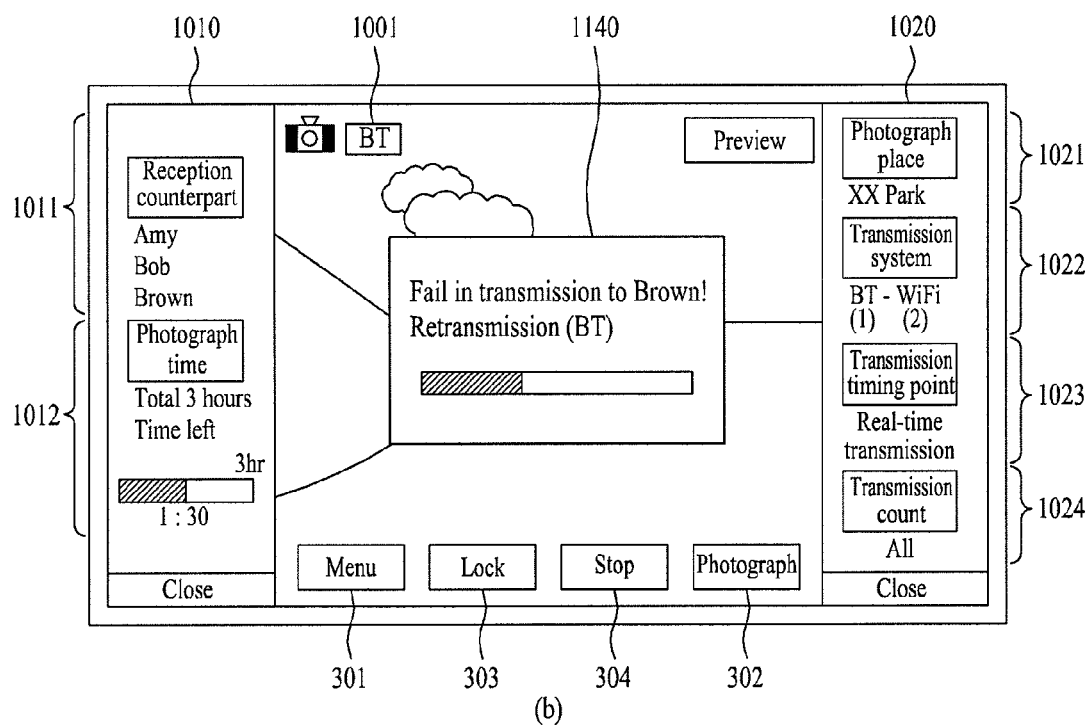

Referring to FIG. 11C, as a result of transmitting the currently photographed image to the reception counterparts Amy, Bob and Brown (cf. 1011) using Bluetooth (cf. 1022) of the 1$^{st}$ priority, if the mobile terminal 100 fails in the transmission to Brown, the mobile terminal 100 is able to try the image retransmission to Brown using WiFi (cf. 1022) of the 2$^{nd}$ priority [a] or Bluetooth of the 1$^{st}$ priority [b].

Figure 11D:
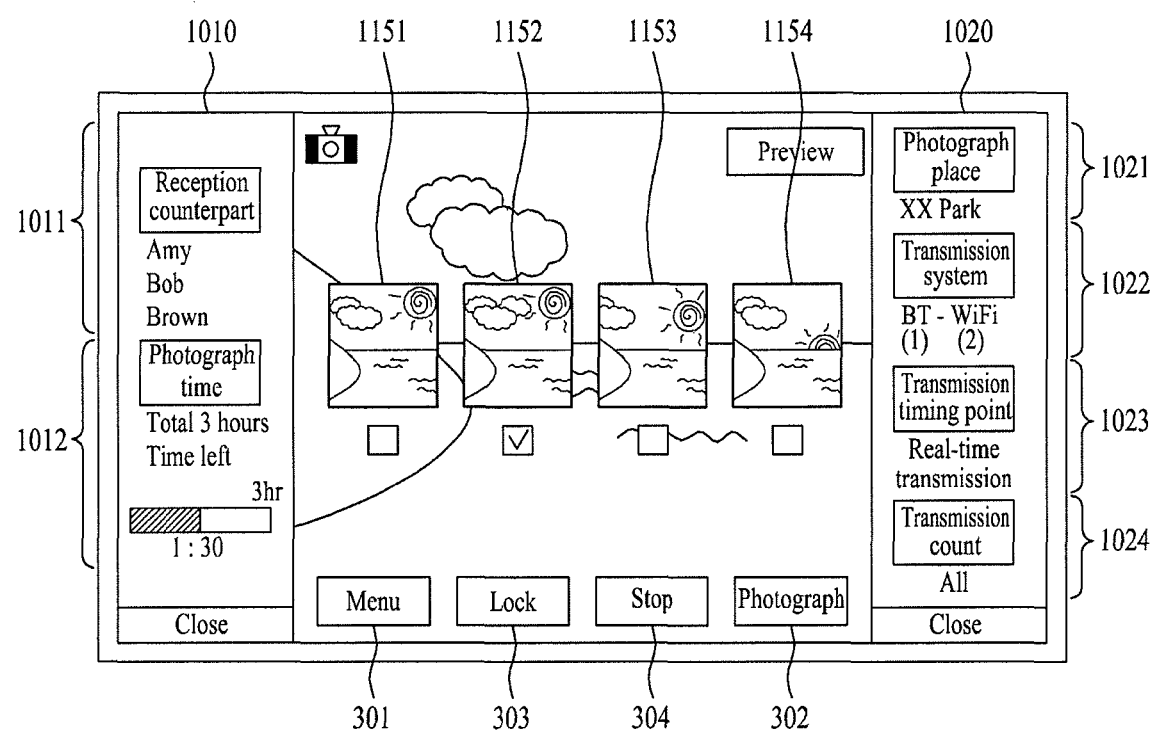

Referring to FIG. 11D, in cased that a plurality of images 1151 to 1154 are photographed for a predetermined time (e.g., a burst mode photographing, etc.), the mobile terminal 100 displays a plurality of the photographed images 1151 to 1154 to enable a user to select at least one of the photographed images to transmit. Therefore, if the second image 1152 is selected from a plurality of the images 1151 to 1154, the mobile terminal 100 is able to transmit the second image 1152 to a counterpart terminal only.

For instance, a plurality of the images photographed for the predetermined time can include identical or similar images photographed in a relatively short time (e.g., 0.5 second, 1 second, several seconds, etc.).

According to the present invention, the mobile terminal 100 enables an image photographed via the camera 121 to be stored in the memory 160 under the control of the controller 180. If the photographed image is transmitted by the above-mentioned method (cf. FIGS. 2 to 11D), the mobile terminal 100 also enables transmission related information on the photographed image to be stored by being linked with the photographed image.

For instance, the transmission related information can include a transmission hour of the photographed image, a transmit or photograph place, reception counterpart information, transmission system and the like.

In the following description, how the transmission related information is stored in a manner of being linked with the photographed image is explained in detail with reference to FIGS. 12A to 12C.

Figure 12A:
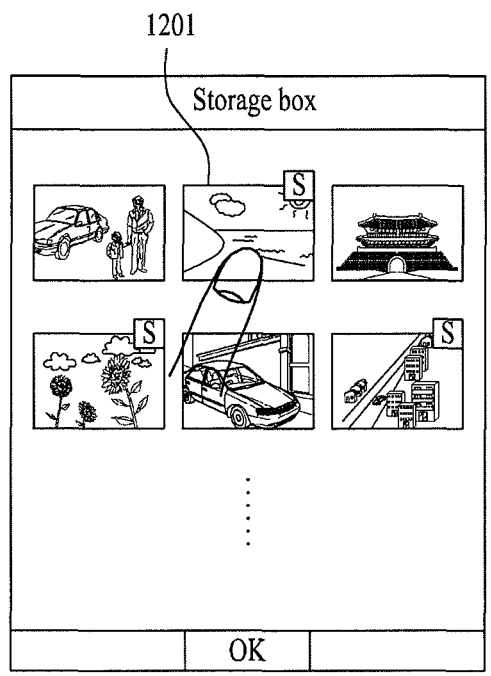
FIGS. 12A to 12C are diagrams of screen configurations for a state that transmission related information is stored by being linked with a photographed image according to the present invention.
Figure 12B:
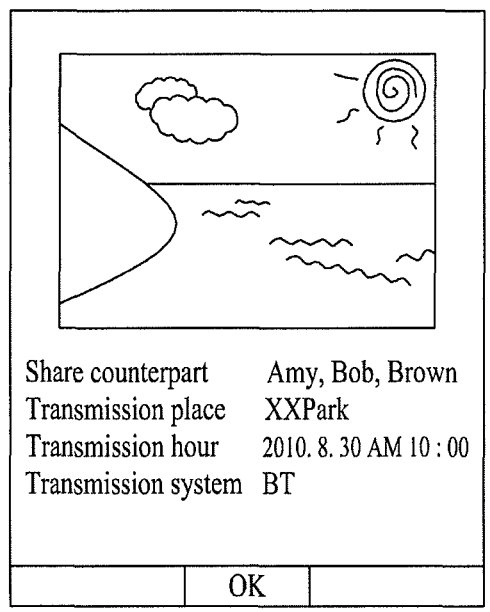
Figure 12C:
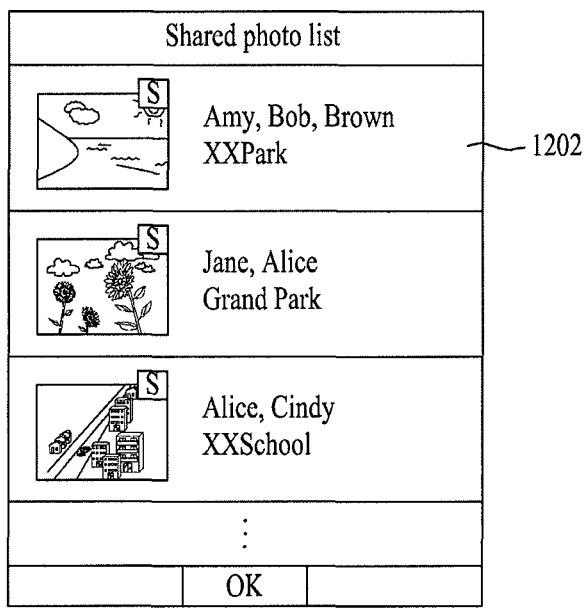

FIGS. 12A to 12C are diagrams of screen configurations for a state that transmission related information is stored and linked with a photographed image according to the present invention.

Referring to FIG. 12A, the mobile terminal 100 is able to display an image list including a plurality of photographed images. In particular, the image list can be displayed as thumbnails.

In this case, a letter 'S (abbreviation of sharing)' can be displayed on each of the photographed images included in the image list to indicate whether the corresponding image is transmitted to a counterpart terminal.

Referring to FIG. 12B, if a specific image 1201 is selected from the image list shown in FIG. 12A by a user, the mobile terminal 100 is able to display transmission related information on the specific image 1201.

Referring to FIG. 12C, the mobile terminal 100 is able to display a transmitted image list including photographed images transmitted to a counter part terminal among a plurality of photographed images.

In this case, specific information (e.g., reception counterpart terminal information, photograph place information, etc.) in the corresponding transmission related information can be displayed on each of the photographed images included in the transmitted image list.

If a specific image 1020 is selected in FIG. 12C by a user, the transmission related information on the specific image 1202 can be displayed in detail [cf. FIG. 12B].

According to an embodiment of the present invention, under the control of the controller 180, the mobile terminal 100 previously obtains access information of a counterpart terminal, stores the obtained access information in the memory 160, and is then able to transmit a photographed image to the counterpart terminal using the stored access information.

In the following description, explained is a case that the access information of the counterpart terminal includes Bluetooth (BT) address information of the counterpart terminal. This is described in detail with reference to FIGS. 13A to 13D as follows.

FIGS. 13A to 13D are diagrams of screen configurations for transmitting a photographed image to a counterpart terminal using a previously-acquired Bluetooth address of the counterpart terminal according to the present invention.

Figure 13A:
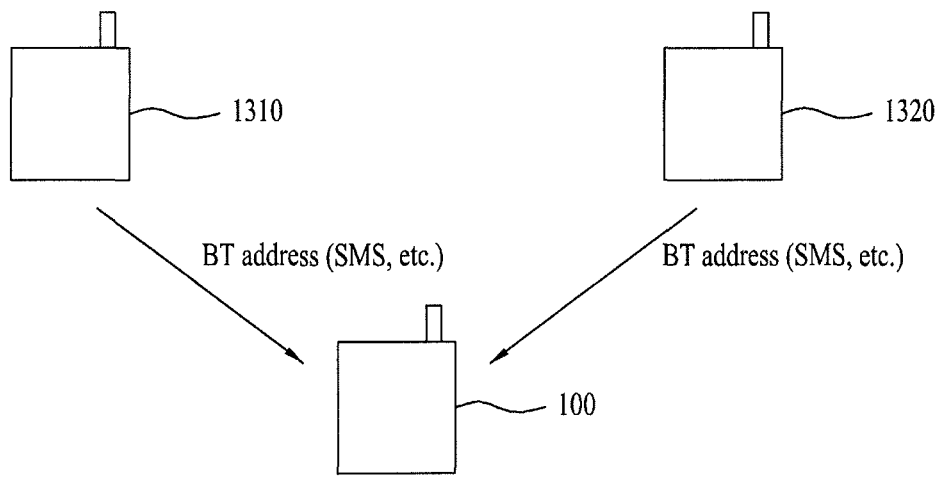
FIGS. 13A to 13D are diagrams of screen configurations for transmitting a photographed image to a counterpart terminal using a previously-acquired Bluetooth address of the counterpart terminal according to the present invention.

Referring to FIG. 13A, the mobile terminal 100 previously receives Bluetooth address information from each of at least one or more counterpart terminals 1310 and 1320 before an image photographing and is then able to store the received Bluetooth address information. For instance, the Bluetooth address information can be received by such a data communication system as SMS (short message service), IrDA (infrared communication), IMS (instant messaging service) and the like.

Figure 13B:

Referring to FIG. 13B, the mobile terminal 100 is able to manage and store the received Bluetooth address information of the counterpart terminal shown in FIG. 13A as one of counterpart terminal information. Therefore, the mobile terminal 100 is able to manage the Bluetooth address information as the counterpart terminal information together with a phone number, a representative image, a representative name, birthday information, email address information and the like. Moreover, the mobile terminal 100 is able to manage its Bluetooth address information as terminal information of its own.

Figure 13C:
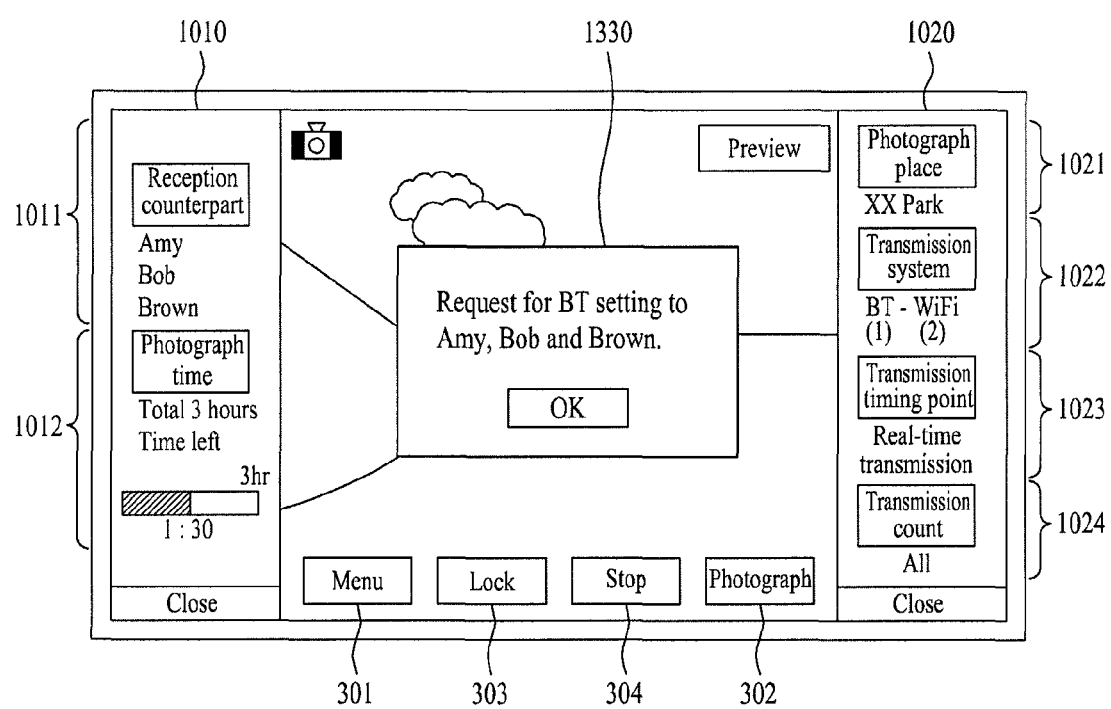

Referring to FIG. 13C, reception counterparts of a currently photographed image are set to Amy, Bob and Brown, respectively, the image transmission system is set to Bluetooth, and Bluetooth address informations of Amy, Bob and Brown are previously stored in the mobile terminal 100. If so, the mobile terminal 100 is able to send a Bluetooth request message for requesting a Bluetooth setting to Amy, Bob and Brown prior to a transmission of the currently photographed image. In this case, the Bluetooth request message can include a pairing key and Bluetooth address information of the mobile terminal 100.

Figure 13D:
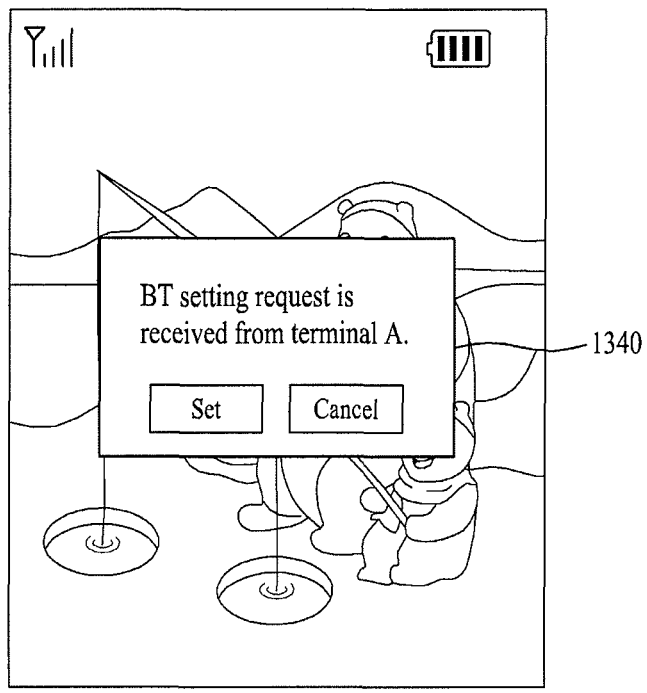
Figure 13D:
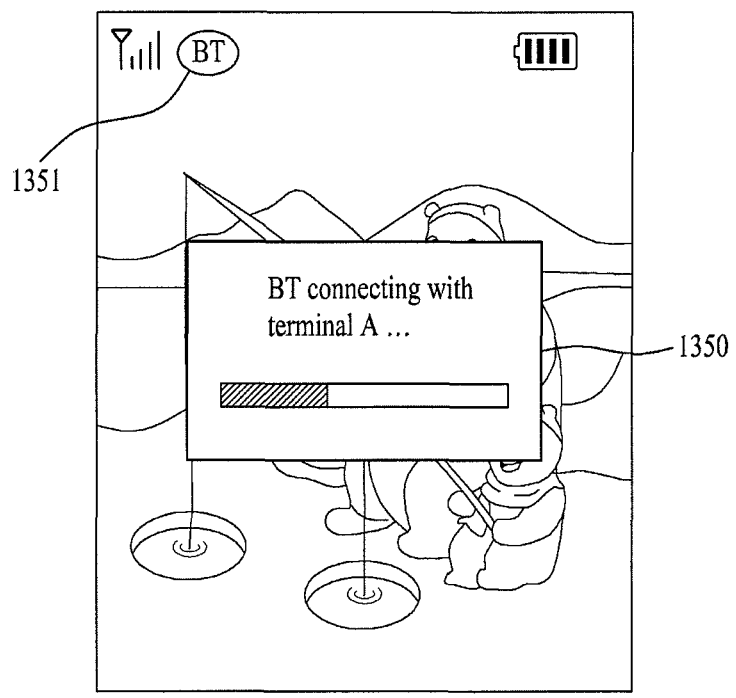

FIG. 13D shows a screen of the counterpart terminal having received the Bluetooth request message.

Referring to FIG. 13D, in case of receiving the Bluetooth request message from the mobile terminal 100, the counterpart terminal outputs a text 1320 indicating that there is a Bluetooth request [a]. If a user selects a Bluetooth setting (set), the counterpart terminal is able to perform a process for a Bluetooth connection with the mobile terminal 100 [b].

In doing so, if a Bluetooth module of the counterpart terminal is turned off, the counterpart terminal is able to turn on its Bluetooth module due to the selection of the Bluetooth setting.

In doing so, as the pairing key included in the Bluetooth request message is shared between the mobile terminal 100 and the counterpart terminal, a process for obtaining a pairing key can be skipped. Since the mobile terminal has already obtained the Bluetooth address information of the counterpart, a process for searching for the counterpart terminal (or its Bluetooth module) can be skipped.

As the Bluetooth connecting process is performed, an indicator or icon 1351, which indicates the Bluetooth connection, can be displayed on the screen of each of the mobile terminal 100 and the counterpart terminal.

Therefore, the mobile terminal performs the process for the Bluetooth connection with each of Amy, Bob and Brown. As the Bluetooth connecting processes are completed, the mobile terminal 100 is able to transmit the photographed image to each of Amy, Bob and Brown using Bluetooth.

According to the present invention, under the control of the controller 180, the mobile terminal 100 is able to transmit an image photographed by the mobile terminal 100 to a plurality of counterpart terminals step by step. This may be more advantageous to a case of sequentially transmitting the photographed image to a plurality of counterpart terminals instead of simultaneously transmitting the photographed image.

In particular, in case of attempting to transmit the photographed image to a plurality of counterpart terminals, the mobile terminal 100 transmits the photographed image to a specific counterpart terminal and enables the specific counterpart terminal to forward the photographed image to a different counterpart terminal.

Moreover, the mobile terminal 100 is able to transmit access information (e.g., phone number, Bluetooth address information, email address information, etc.) of the different counterpart terminal, to which the specific counterpart terminal should forward the photographed image, to the specific counterpart terminal together with the photographed image. Alternatively, if the different counterpart terminal, to which the specific counterpart terminal should forward the photographed image, is previously designated, the mobile terminal 100 may not transmit the access information of the different counterpart terminal.

Moreover, the mobile terminal 100 and a plurality of the counterpart terminals can be previously set a group for performing the step-by-step image transmission. In this case, each of the mobile terminal 100 and a plurality of the counterpart terminals are able to previously obtain and store access informations of the terminals belonging to the corresponding group. Alternatively, each of a plurality of the counterpart terminals is able to previously designate a terminal to forward an image to the corresponding counterpart terminal and a terminal to which the corresponding counterpart terminal will forward the image. And, an image received from a specific terminal can be previously designated to be forwarded to another specific terminal.

The step-by-step image transmission is explained in detail with reference to FIG. 14A and FIG. 14B as follows.

For clarity of the following description, assume a case that the step-by-step image transmission is performed among the mobile terminal 100 and $1^{st}$ to $7^{th}$ counterpart terminals 1410 to 1470. And, assume that it takes one second for one transmission.

Figure 14A:
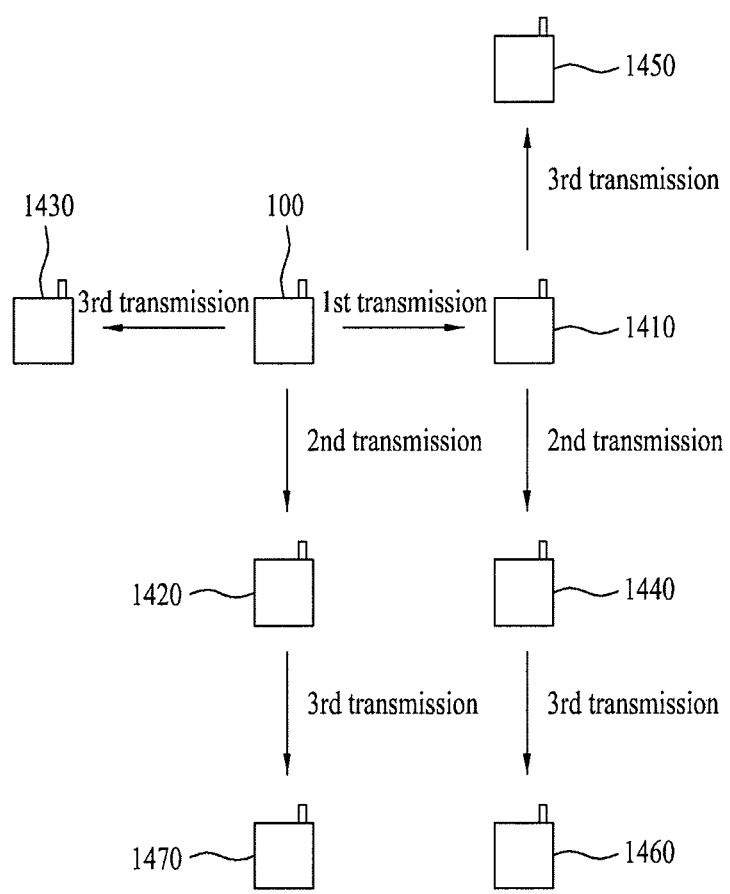
FIG. 14A and FIG. 14B are diagrams showing a process for transmitting a photographed image to a plurality of counterpart terminals step by step according to the present invention.
Figure 14B:
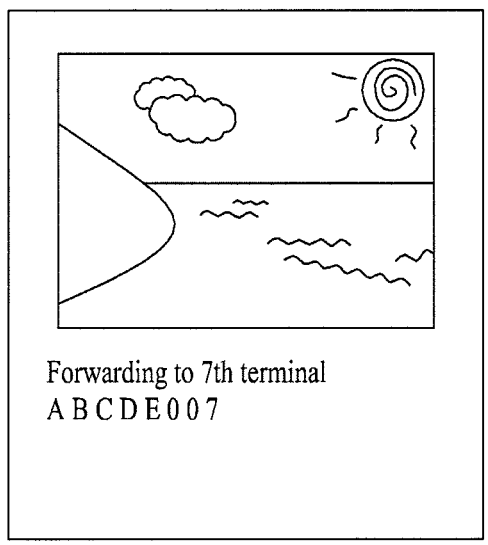
Figure 14B:
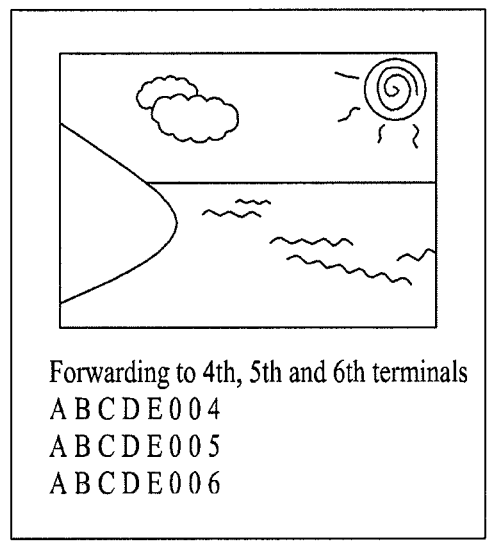
Figure 14B:
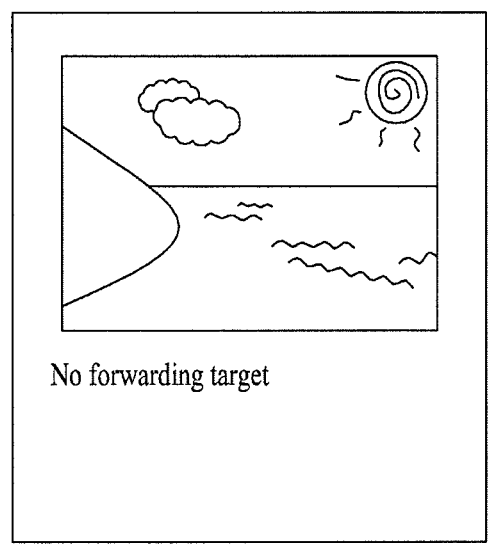

FIG. 14A and FIG. 14B are diagrams showing a process for transmitting a photographed image to a plurality of counterpart terminals step by step according to the present invention.

FIG. 14A shows an image forwarding structure among the mobile terminal 100 and $1^{st}$ to $7^{th}$ counterpart terminals 1410 to 1470.

Referring to FIG. 14A, the mobile terminal 100 transmits an image to the $1^{st}$ counterpart terminal 1410 [$1^{st}$ transmission]. After completion of the $1^{st}$ transmission, the mobile terminal 100 transmits the image to the $2^{nd}$ counterpart terminal 1420 [$2^{nd}$ transmission]. After completion of the $2^{nd}$ transmission, the mobile terminal 100 then transmits the image to the $3^{rd}$ counterpart terminal 1430 [$3^{rd}$ transmission].

In doing so, the $1^{st}$ counterpart terminal 1410 transmits the image received from the mobile terminal 100 to the $4^{th}$ counterpart terminal 1440 in the course of the transmission process ($2^{nd}$ transmission) from the mobile terminal 100 to the $2^{nd}$ counterpart terminal 1420 [$2^{nd}$ transmission] and is able to transmit the image received from the mobile terminal to the $5^{th}$ counterpart terminal 1450 in the course of the transmission process ($3^{rd}$ transmission) from the mobile terminal 100 to the $3^{rd}$ counterpart terminal 1430 [$3^{rd}$ transmission].

And, the $2^{nd}$ counterpart terminal 1420 transmits the image received from the mobile terminal 100 to the $7^{th}$ counterpart terminal 1470 in the course of the transmission process ($3^{rd}$ transmission) from the mobile terminal 100 to the $3^{rd}$ counterpart terminal 1430 [$3^{rd}$ transmission].

Moreover, the $4^{th}$ counterpart terminal 1440 transmits the image received from the mobile terminal 100 to the $6^{th}$ counterpart terminal 1460 in the course of the transmission process ($3^{rd}$ transmission) from the mobile terminal 100 to the $3^{rd}$ counterpart terminal 1430 [$3^{rd}$ transmission].

Therefore, if it takes to sequentially transmit the image from the mobile terminal 100 to the $1^{st}$ to $7^{th}$ counterpart terminals 1410 to 1470, it eventually takes only 3 seconds due to the above-described step-by-step transmissions (i.e., 1 second taken for each of the first to third transmissions).

FIG. 4B shows control information transmitted from the mobile terminal 100 to each of the $1^{st}$ to $3^{rd}$ counterpart terminals 1410 to 1430 to receive the image in direct for the step-by-step image transmission.

Referring to FIG. 14B (a), the mobile terminal 100 is able to provide a command for an image transmission from the $2^{nd}$ counterpart terminal 1420 to the $7^{th}$ counterpart terminal 1470 and access information (e.g., Bluetooth address information) of the $7^{th}$ counterpart terminal 1470 as control information on the $2^{nd}$ counterpart terminal 1420.

Referring to FIG. 14B (b), the mobile terminal 100 is able to provide a command for an image transmission from the $1^{st}$ counterpart terminal 1410 to the $4^{th}$ and $5^{th}$ counterpart terminals 1440 and 1450, a command for an image transmission from the $4^{th}$ counterpart terminal 1440 to the $6^{th}$ counterpart terminal 1460, and access information (e.g., Bluetooth address information) of each of the $4^{th}$ to $6^{th}$ counterpart terminals 1440, 1450 and 1460 as control informations of each of the $2^{nd}$ and $4^{th}$ counterpart terminals 1410 and 1440.

Referring to FIG. 14B (c), it can be observed that the mobile terminal 100 does not provide any control information to the $3^{rd}$ counterpart terminal 1430. Therefore, the $3^{rd}$ counterpart terminal 1430 does not forward the image received from the mobile terminal 100 to other counterpart terminals.

According to the present invention, a counterpart terminal, which is going to receive an image from the mobile terminal 100, is able to set an image reception condition similar to the aforesaid image transmission condition. Therefore, the counterpart terminal is able to receive the image from the mobile terminal 100 to correspond to the set image reception condition.

In particular, the counterpart terminal transmits the set image reception condition to the mobile terminal 100 in order to control the mobile terminal 100 to transmit an image corresponding to the image reception condition to itself only. The counterpart terminal controls the image corresponding to the set image reception condition among the images received from the mobile terminal to be stored and may not store the rest of the images failing in corresponding to the set image reception condition.

The setting of the image reception condition is explained in detail with reference to FIGS. 15A to 15C as follows.

Figure 15A:
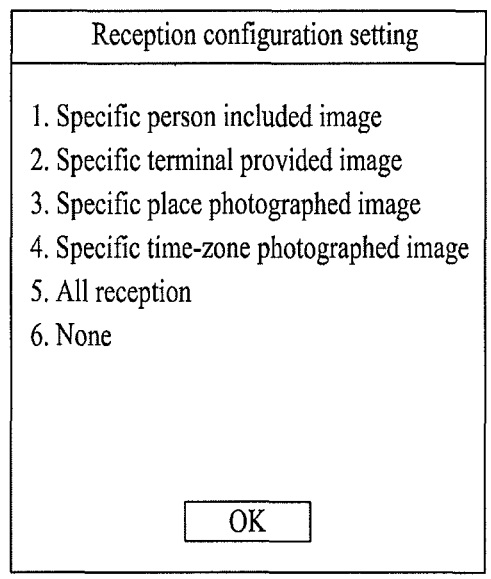
FIGS. 15A to 15C are diagrams of screen configurations for setting an image reception condition in a reception counterpart terminal according to the present invention.
Figure 15B:
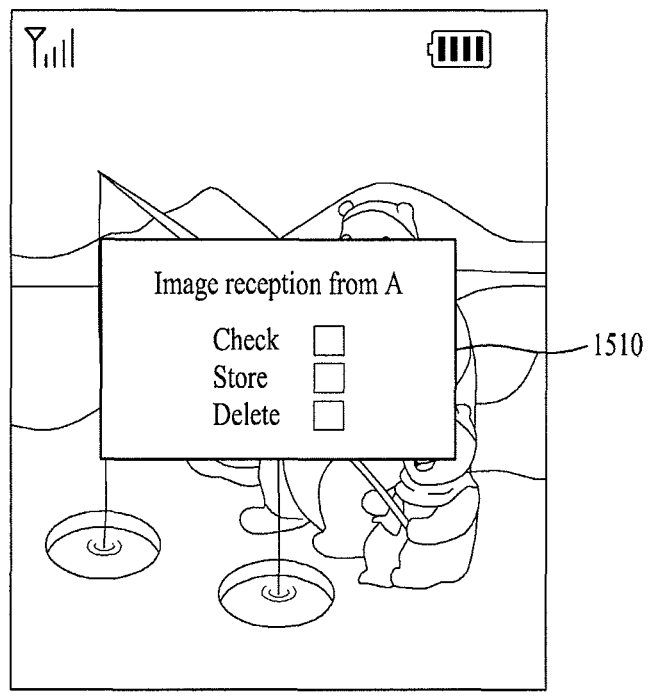
Figure 15C:
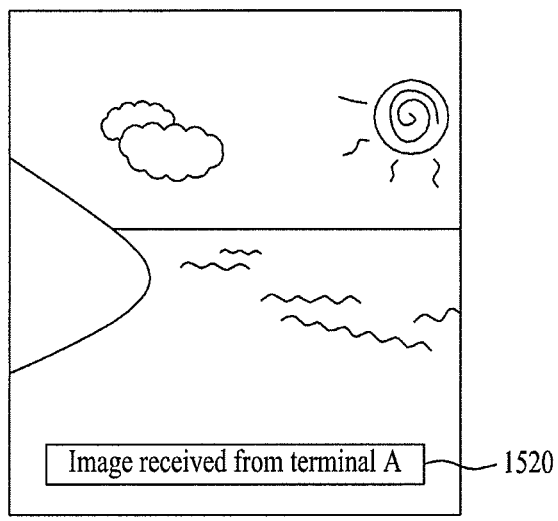

FIGS. 15A to 15C are diagrams of screen configurations for setting an image reception condition in a reception counterpart terminal according to the present invention.

Referring to FIG. 15A, a counterpart terminal sets an image reception condition to a condition for receiving an image including a specific character only (i.e., a specific person included image), a condition for receiving an image provided by a specific terminal only (i.e., a specific terminal provided image), a condition for receiving an image photographed at a specific place only (i.e., a specific place photographed image), or a condition for receiving an image photographed on a specific time zone only (i.e., a specific time-zone photographed image).

Of course, if the image reception condition is set to 'receive all', the counterpart terminal is able to receive all images provided by an external terminal. If the image reception condition is set to 'None', the counterpart terminal may not receive any image provided by an external terminal.

Referring to FIG. 15B, in case of receiving an image from a specific terminal to correspond to the set image reception condition, the counterpart terminal is able to display a window 1510 for enabling a user of the counterpart terminal to select one of checking (cf. whether to store the received image can be determined later), storing (cf. whether to check the received image can be determined later) and deleting the received image.

Referring to FIG. 15C, if 'check' is selected in FIG. 15B, the counterpart terminal is able to display the received image on the screen.

According to various embodiments of the present invention, the above-described image transmitting methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, and optical data storage devices.

Accordingly, the present invention provides the following effects and/or advantages.

First of all, the present invention is able to set an image transmission condition before an image photographing, thereby quickly transmitting a photographed image to a counterpart terminal to correspond to the previously set image transmission condition without setting the image transmission condition one by one in case of the image photographing.

Secondly, the present invention is able to variously set a transmission target photographed image, a counterpart terminal to receive an image, an image transmission system, an image transmission timing point and the like to correspond to an image transmission condition.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a user input unit;
a camera;
a memory,
a wireless communication unit; and
a controller operatively connected to the user input unit, the camera and the wireless communication unit, the controller configured to:
store at least one contact in a phonebook in the memory,
receive inputs via the user input unit to set image transmission conditions including an image transmission identity condition and an image transmission system condition,
photograph an image with the camera when the mobile terminal is in a camera photograph mode,
determine whether at least one character in the photographed image has the same identity as another character associated with any of the at least one contact in the phonebook that is registered as being included in a counterpart image,
if the at least one character in the photographed image has the same identity as the another character, set the image transmission identity condition based on the at least one character in the photographed image instead of the received inputs,
if none of the at least one character in the photographed image has the same identity as the another character, set the image transmission identity condition and the image transmission system condition based on the received inputs,
wherein the image transmission system condition corresponds to a type of transmission method for transmitting the photographed image, and
transmit the photographed image via the wireless communication unit to a counterpart terminal according to the image transmission conditions.

2. The mobile terminal of claim 1, further comprising:
a display module operatively connected to the controller,
wherein the controller is configured to control the display module to display the set image transmission conditions on a preview image on the display module when the mobile terminal is in the camera photograph mode.

3. The mobile terminal of claim 1, wherein the image transmission conditions include a photograph time, and
wherein the controller is configured to transmit, via the wireless communication unit, the photographed image to the counterpart terminal at the photograph time.

4. The mobile terminal of claim 1, wherein the image transmission conditions include a photograph place, and
wherein the controller is configured to transmit, via the wireless communication unit, the photographed image to the counterpart terminal at the photograph place.

5. The mobile terminal of claim 1, wherein the image transmission conditions include the identifier of the counterpart terminal, and wherein the controller is configured to transmit, via the wireless communication unit, the photographed image to the counterpart terminal based on the identifier.

6. The mobile terminal of claim 1, wherein the controller is configured to transmit, via the wireless communication unit, the photographed image directly to the counterpart terminal without passing through an external server.

7. The mobile terminal of claim 1, wherein the image transmission conditions include image transmission priorities including a high-priority image transmission priority and a low-priority image transmission priority, and
wherein the controller is configured to:
transmit the photographed image using the high-priority image transmission priority, and
retransmit the photographed image using the low-priority image transmission priority when the image transmission using the high-priority image transmission priority is not successful.

8. The mobile terminal of claim 1, wherein the controller is configured to determine whether the at least one character in the photographed image has the same identity as another character in an image associated with an SNS account that is registered as being included in a counterpart image stored in the counterpart terminal.

9. The mobile terminal of claim 1, wherein the type of transmission method includes at least one of multimedia message service (MMS), email, Bluetooth, WiFi, and infrared communication (IrDA).

10. The mobile terminal of claim 1, further comprising:
a display module,
wherein the controller is further configured to:
control the memory to store a plurality of images including the photographed image, and
control the display module to display an image list including at least one shared image among the plurality of images.

11. The mobile terminal of claim 10, wherein the controller is configured to control the display module to display the image list including only the at least one shared image among the plurality of images.

12. The mobile terminal of claim 1, further comprising:
a display module,
wherein the controller is configured to:
photograph a plurality of images with the camera when the mobile terminal is in the camera photograph mode,
control the display module to display the plurality of photographed images,
receive a selection of one of the plurality of photographed images, and
transmit the selected photographed image via the wireless communication unit to the counterpart terminal according to the image transmission conditions.

13. The mobile terminal of claim 12, wherein the controller is configured to automatically photograph the plurality of images in a relatively short time.

14. A method of transmitting an image in a mobile terminal, the method comprising:
storing at least one contact in a phonebook in a memory;
receiving inputs via a user input unit to set image transmission conditions including an image transmission identity condition and an image transmission system condition;
photographing the image with a camera of the mobile terminal when the mobile terminal is in a camera photograph mode;
determining whether at least one character in the photographed image has the same identity as another character associated with any of the at least one contact in the phonebook that is registered as being included in a counterpart image;
if the at least one character in the photographed image has the same identity as the another character, setting the image transmission identity condition based on the character in the photographed image instead of the received inputs;
if none of the at least one character in the photographed image has the same identity as the another character, setting the image transmission identity condition and the image transmission system condition based on the received inputs,
wherein the image transmission system condition corresponds to a type of transmission method for transmitting the photographed image;
checking the set image transmission conditions after the image is photographed; and
wirelessly transmitting the photographed image from the mobile terminal to a counterpart terminal according to the checked image transmission conditions.

15. The method of claim 14, further comprising:
storing, the memory of the mobile terminal, access information of the counterpart terminal; and
transmitting the photographed image to the counterpart terminal using the stored access information.

16. The method of claim 14, further comprising:
displaying, on a display module of the mobile terminal, the set image transmission identity condition and the set image transmission system condition on a preview image when the mobile terminal is in the camera photograph mode.

17. The method of claim 14, wherein the image transmission conditions include at least one of a photograph time and a photograph place, and
wherein the transmitting step includes transmitting the photographed image to the counterpart terminal at the photograph time or the photograph place when the checked image transmission conditions include the photograph time or the photograph place, respectively.

18. The method of claim 14, wherein the image transmission conditions include a terminal identifier, and
wherein the transmitting step includes transmitting the photographed image to the counterpart terminal based on the terminal identifier.

19. The method of claim 14, wherein the image transmission conditions include image transmission priorities including a high-priority image transmission priority and a low-priority image transmission priority, and
wherein the transmitting step includes:
transmitting the photographed image using the high-priority image transmission priority; and
retransmitting the photographed image using the low-priority image transmission priority when the image transmission using the high-priority image transmission priority is not successful.

* * * * *